United States Patent [19]
Simmons

[11] 3,862,036
[45] Jan. 21, 1975

[54] APPARATUS AND METHOD FOR RAPID CYCLIC FILTRATION OF CONTAMINANTS FROM LIQUIDS

[75] Inventor: Phillip J. Simmons, Toronto, Ontario, Canada

[73] Assignees: Wix Corporation, Gastonia, N.C.; Wix Corporation Limited, Toronto, Canada

[22] Filed: Mar. 9, 1973

[21] Appl. No.: 339,507

Related U.S. Application Data

[63] Continuation-in-part of Ser. No. 87,852, Nov. 9, 1970, abandoned.

[52] U.S. Cl. ............ 210/82, 210/141, 210/412, 210/489, 210/499
[51] Int. Cl. ............................................ B01d 29/38
[58] Field of Search ............ 210/141, 82, 108, 411, 210/412, 391, 356, 446, 448, 489, 499

[56] References Cited
UNITED STATES PATENTS

| | | | |
|---|---|---|---|
| 227,800 | 5/1880 | Loomis | 210/356 X |
| 851,388 | 4/1907 | Wallace | 210/411 |
| 1,214,152 | 1/1917 | Genter | 210/412 X |
| 2,990,238 | 6/1961 | Kagisch et al. | 210/82 X |
| 3,043,431 | 7/1962 | Dudley et al. | 210/82 |
| 3,327,866 | 6/1967 | Pazz et al. | 210/499 |
| 3,386,585 | 6/1968 | Weyand et al. | 210/446 X |
| 3,437,208 | 4/1969 | Kaspar et al. | 210/391 X |
| 3,630,360 | 12/1971 | Davis et al. | 210/82 |

*Primary Examiner*—John Adee
*Attorney, Agent, or Firm*—Shoemaker and Mattare

[57] ABSTRACT

Apparatus and method for filtering solids from liquid, including filter means, pump means and valve means operatively connected to one another in conduit means to alternately cause a substantially uniform flow rate forwardly through the filter for a predetermined time of from about 0.0001 seconds to about 1.0 second, and then to cause a substantially uniform flow rate of the filtered liquid reversely through the filter for a predetermined time of from about 0.0001 seconds to about 1.0 second, the ratio of filtered time to non-filter time being substantially greater than 1:1, and not greater than about 15:1, to effect rapid cyclic filtration of solids from the liquid and to maintain a substantially fluidized, non-compacted bed of solids in front of the filter and to obtain a much higher net flow rate of filtered liquid than heretofore obtained, the net flow of liquid through the filter approaching that of a clean liquid through a clean filter.

31 Claims, 34 Drawing Figures

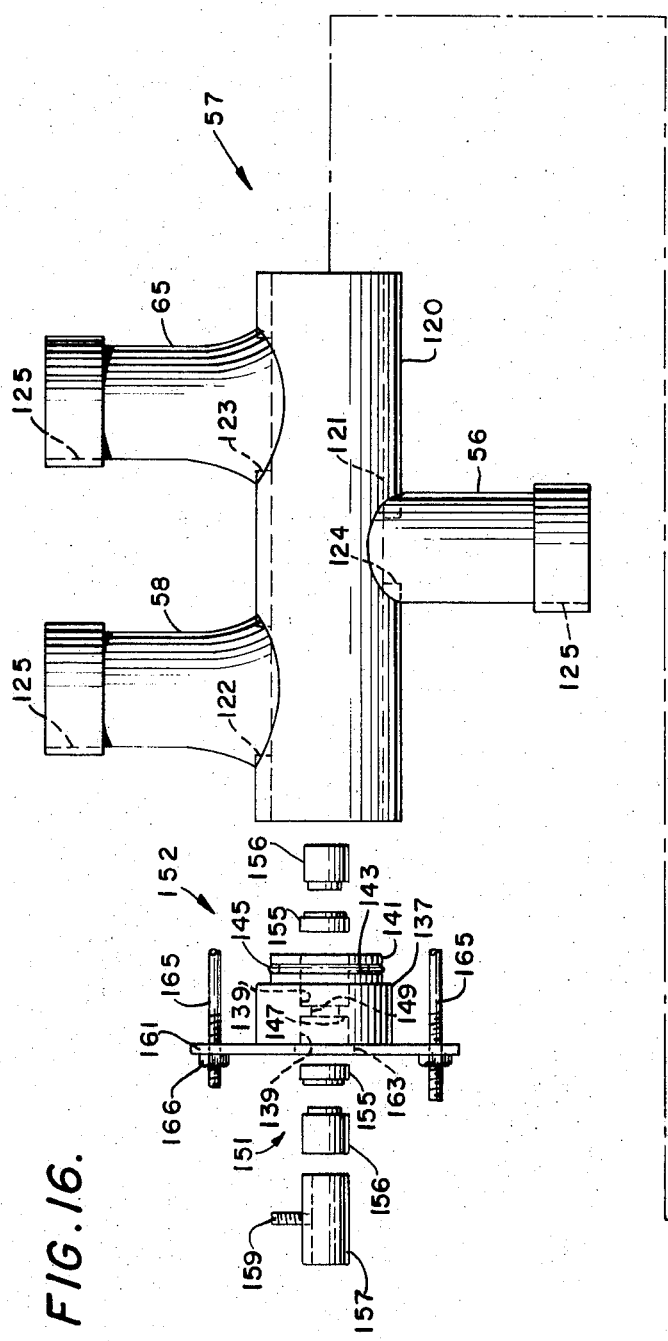
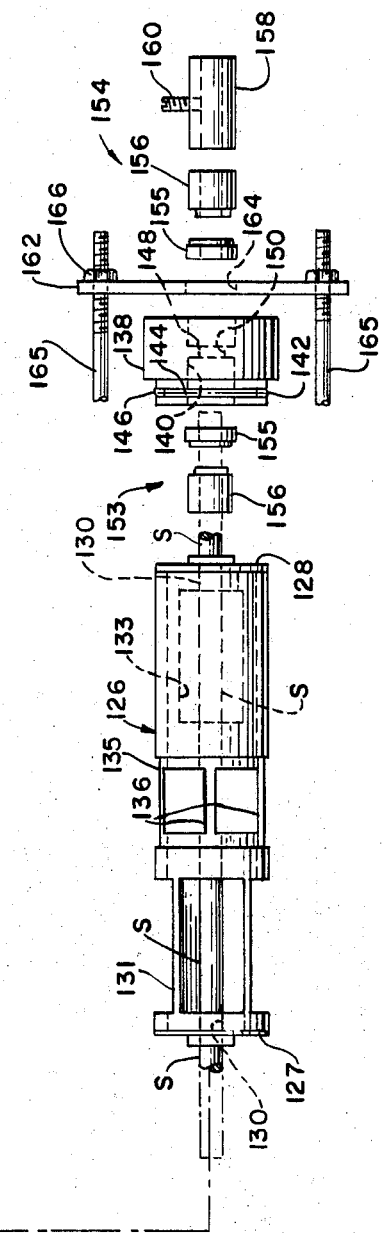
FIG. 16.

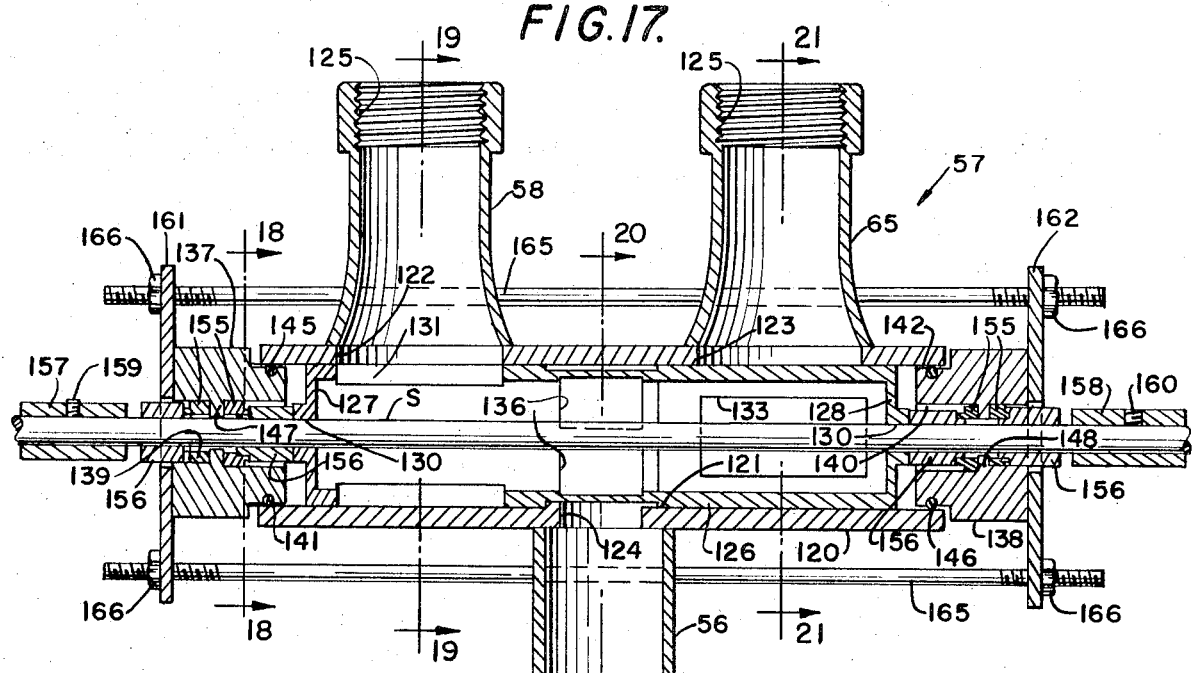
FIG. 17.
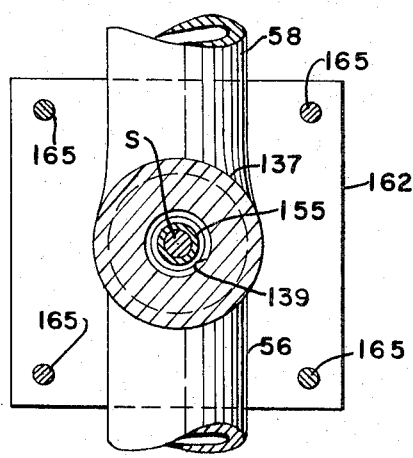
FIG. 18.
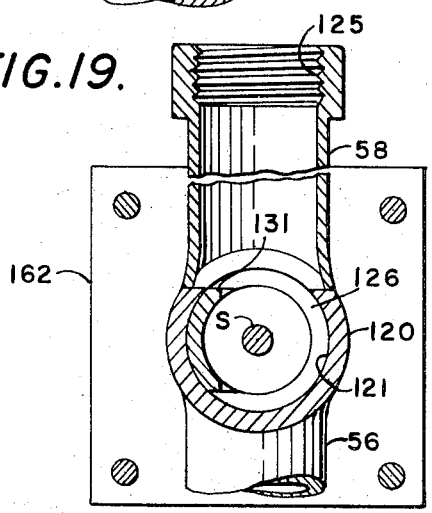
FIG. 19.
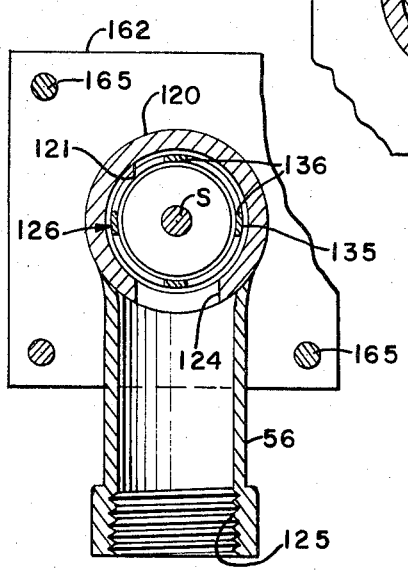
FIG. 20.
FIG. 21.

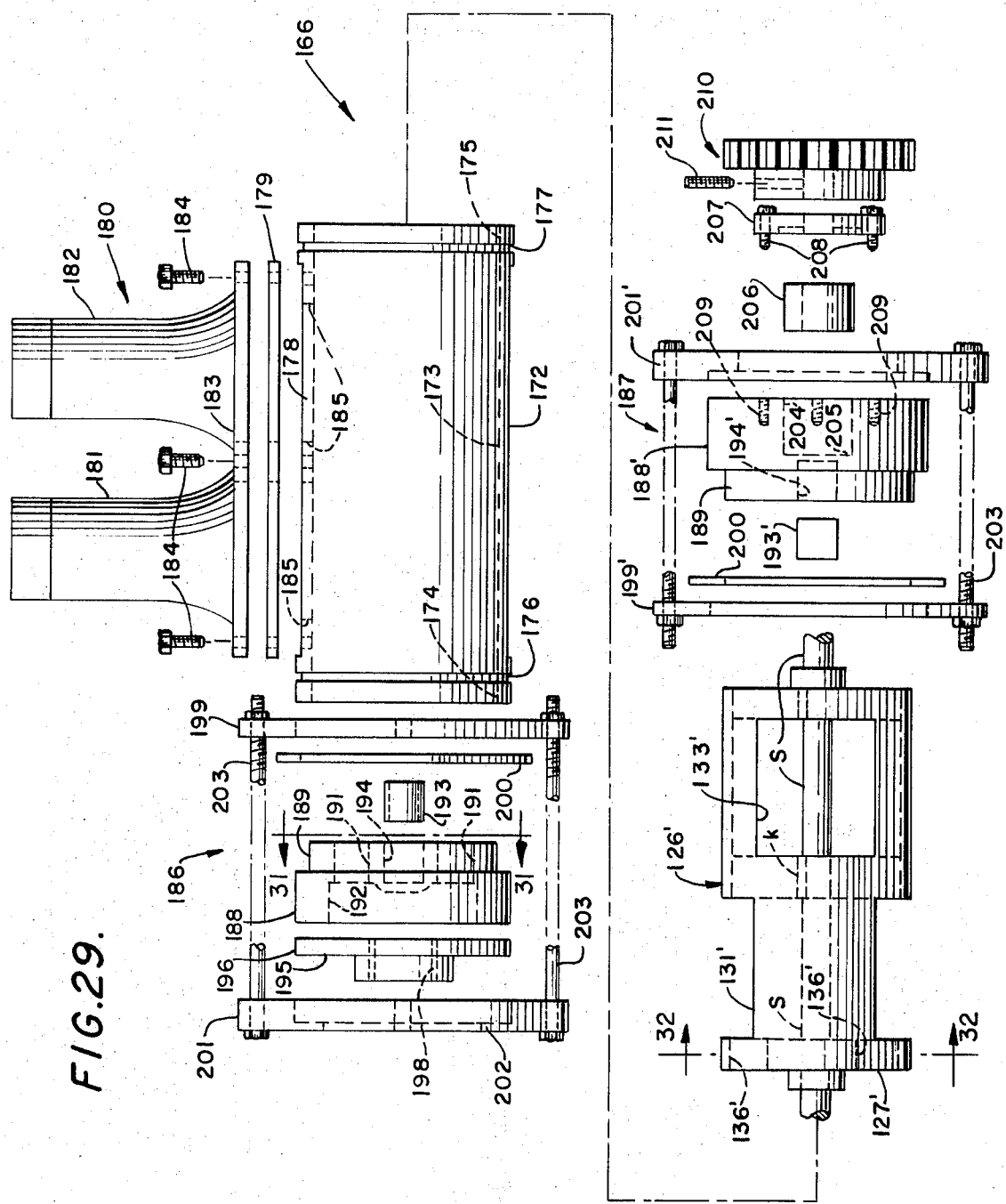

APPARATUS AND METHOD FOR RAPID CYCLIC FILTRATION OF CONTAMINANTS FROM LIQUIDS

BACKGROUND OF THE INVENTION

This application is a continuation-in-part application of Application Ser. No. 87,852, entitled APPARATUS AND METHOD FOR RAPID CYCLIC FILTRATION OF CONTAMINANTS FROM LIQUIDS filed Nov. 9, 1970 now abandoned.

This invention relates to a method and apparatus for the rapid cyclic filtration of liquids having solid particles suspended therein.

The filtration of such liquids, or slurries has heretofore generally been carried out on a commercial scale by means of pressure filters of various types, such as filter presses, continuous drum pressure (or vacuum) filters, belt pressure filters, and automatic filter presses.

Such devices, while certainly not inoperable, are subject to a variety of drawbacks which render the filtration process relatively uneconomical. Firstly, the initial investment cost is high, as are the operating expenses. In the case of filter presses, there is the added disadvantage of high maintenance costs due to excessive wear of operating components such as filter cloth. In the case of continuously operating filters, difficulties are encountered with the discharge of the filter cake, the stretching of the filter cloth, and the sealing of movable parts against the introduction of contaminants.

The most serious drawback is the low capacity of all of these devices, relative to the useable filtration surface. This is a result of the reduction in efficiency caused by the formation and compression of the filter cake on the filter media surface during the filtration process and consequently larger filter media surface or area is required for a given flow rate.

Higher filtration rates are obtained, even with smaller filter media surfaces, if the filtration time is very short and a substantially fluidized bed of non-compacted contaminants is maintained in front of the filter media. The flow rate in such a system approaches that of the flow of pure liquid through a clean media.

Some prior art filters are operated in a cyclic fashion, the cycle usually consisting of the following steps; the filtration step, the filter cake washing step, which is optional, the filter cake drying step, which is optional, and the filter cake discharge step. The cake discharge is usually accomplished by reverse flow of liquid therethrough, scraping of the media, moving of the media relative to the cake, or by a combination of these methods.

The cycle time in these prior art systems, which is the time required to accomplish all operational steps, usually ranges from about 30 seconds to as much as several hours, causing low capacity relative to the useable filtration surface area. Moreover, most such systems rely on the development of a solid filter cake which greatly reduces the filtration rate. Other prior art systems have shorter cycle times but either do not have substantially uniform flow therethrough, or the backwash time and filtration time are substantially equal, thus resulting in a low net flow rate.

The principal idea of the present invention is to keep the media as clean as possible in order to take advantage of the high initial filtration rates.

The rapid cyclic filter of the present invention is a discontinuous, pulsating type of filter with a total off-time, including both backwash and any other non-operational times, of from about 0.0001 seconds to about 1 second, and a filtration time of from about 0.0001 seconds to about 1 second, the ratio of non-filtration time to filtration time being substantially greater than 1:1 and not greater than about 15:1, and although the rapid cyclic filter is not a continuous filtration unit, it does operate at nearly constant rate and constant pressure, and the net flow rate therethrough approaches the net flow rate of a clean liquid through a clean filter media.

The rapid cyclic filter of the invention operates in a cyclic steady-state during which the contaminants are either loosely packed, fluidized or completely removed each cycle, but not allowed to compact as in the usual "cake" filtration methods.

The backwash velocity in the present invention is, of necessity, very high to facilitate cleaning of the filter media. Therefore, the filter media area is preferably kept to a minimum but still large enough that it adds very little pressure drop to the system.

With the apparatus of the present invention, on forward flow the liquid and particles suspended therein are caused to move toward the filter media from all regions of the slurry, with the result that the liquid and suspended particles move toward the filter media with a slower velocity than during reverse flow of filtrate through the filter. During reverse flow, filtered liquid moves back through the filter into the slurry in a defined stream of high velocity to thus maintain the suspended particles away from the filter media in a fluidized, non-compacted bed of liquid and suspended particles.

It is only at the filter media itself that the flow rate in both the forward and reverse directions can approach the same value.

Due to the mode of operation of the present invention, a concentrated slurry may be allowed to accumulate in the container, thus not allowing a perfect cyclic steady-state operation, or it may be removed periodically, or continuously, as desired.

Due to the above characteristics of the rapid cyclic filter, the net over all flow rate approaches that of a pure liquid through a clean filter media and is a substantial improvement over currently available filters since in such prior art filters the flow rate decreases in a non-linear fashion during the filtration portion of the cycle as the contaminant clogs the media and the average filtration rate decreases as the filtration time is increased.

Further, rapid cyclic filtration according to the present invention can be used to substantially prolong the life of a depth filter media, which if used in similar circumstances in a non-cyclic fashion, will clog more rapidly.

OBJECTS OF THE INVENTION

It is an object of this invention to provide an apparatus and method for the filtration of solids from liquid, wherein unique rotary valve means are used to alternately divert flow forwardly through the filter and then reversely through the filter to backwash the filter and maintain a fluidized bed of solids in front of the filter.

Another object of the invention is to provide a unique filter media for use in a rapid cyclic filter apparatus in which the filter time is from about 0.0001 seconds to about 1.0 second, and the non-filter time is from about 0.0001 seconds to about 1.0 second, the ratio of the filter time to non-filter time being greater than 1:1 and not greater than 15:1.

A still further object of the invention is to provide a method and apparatus for rapid cyclic filtration of solids from liquid wherein the net flow of liquid through the apparatus approaches that of clean liquid through a clean filter media.

A further object of the invention is to provide a unique rotary valve for alternately diverting flow through one of two ports to alternately cause flow to occur forwardly through a filter media and then reversely through the filter media to backwash the filter media.

BRIEF DESCRIPTION OF THE DRAWINGS

FIG. 16 is an enlarged exploded view of the unique rotary valve used in the filtering apparatus of FIGS. 4, 5 and 6.

FIG. 17 is an assembled view in section of the valve of FIG. 16.

FIG. 18 is an enlarged view in section taken along line 18—18 in FIG. 17.

FIG. 19 is an enlarged view in section taken along line 19—19 in FIG. 17.

FIG. 20 is an enlarged view in section taken along line 20—20 in FIG. 17.

FIG. 21 is an enlarged view in section taken along line 21—21 in FIG. 17.

FIG. 29 is an enlarged exploded view of a unique modified rotary valve used in the modified one pump, two valve apparatus of FIGS. 22 and 23.

DETAILED DESCRIPTION OF THE INVENTION

Figure 1:
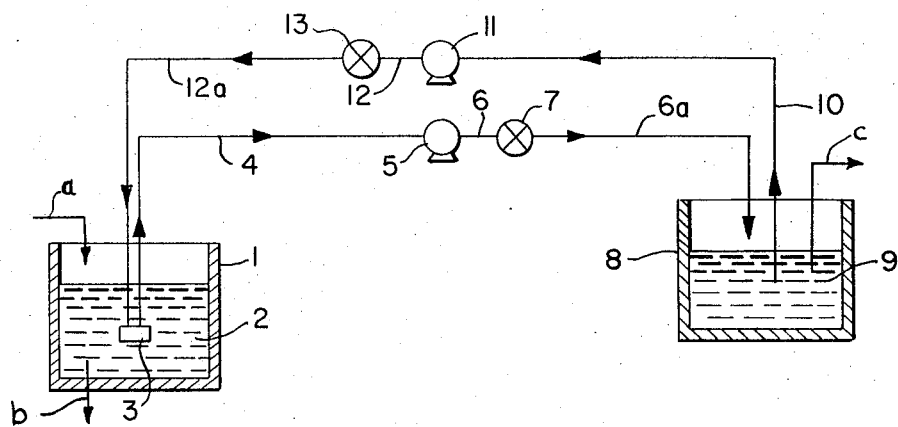
FIG. 1 is a greatly simplified schematic view of a first form of the invention wherein a pair of pumps and a pair of valves are utilized to effect cyclical filtration and backflow through the filter media.

Referring now to the drawings, wherein like reference numerals refer to like parts throughout the several views, a first form of the invention is illustrated schematically in FIG. 1 and comprises a two pump, two valve system, with the valves located on the pressure sides of the pumps. The apparatus of FIG. 1 includes a container or compartment 1 in which is placed a liquid or slurry 2 containing solid contaminants to be filtered. A filter media and holder 3 is disposed within the liquid 2 and is connected by means of a conduit 4 to a suction pump 5 for drawing the liquid 2 through the filter media and holder 3 and through the conduit 4. The filtered liquid flows from the pump 5 through a conduit 6 and an "on-off" valve 7 and through a conduit 6a to a container 8 which contains the filtered liquid or filtrate 9. A conduit 10 is in communication with the filtered liquid or filtrate 9 and extends to a backwash pump 11 for causing the filtered liquid 9 to flow through the conduit 10 and a conduit 12 to an on-off valve 13 and through a conduit 12a and back through the filter holder and filter media 3 to effect backwashing of the filter media. The pumps 5 and 11 may be provided with internal by-passes (not shown) and in a preferred form of the invention run continuously. The valves 7 and 13 are alternately opened and closed, with valve 7 being open when valve 13 is closed and vice versa. Valve 7 is open substantially longer than valve 13 inasmuch as it is desired to have a longer filtration time than back-washing time. The valves 7 and 13 may be operated pneumatically, electromagnetically or by any other suitable means and their operation is controlled by a suitable timing device either electronic or mechanical depending upon the type of valve utilized.

Figure 2:
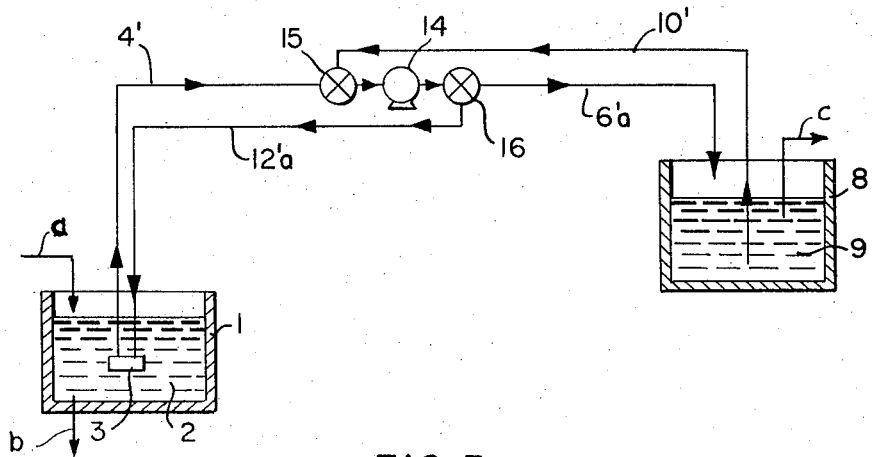
FIG. 2 is a greatly simplified schematic view of a second form of the invention wherein a single pump is used in conjunction with a pair of three-way valves for effecting cyclical filtration and backflow of liquid through the filter media.

In FIG. 2, a modification of the invention is illustrated, and rather than a pair of pumps and a pair of associated on-off valves as in FIG. 1, a single pump 14 is used having a pair of three-way valves 15 and 16 connected at the inlet and outlet of the pump, respectively, for effecting filtration and backwash of liquid through the filter holder and filter media 3. The operation of the FIG. 2 embodiment is similar to the operation of the FIG. 1 embodiment, with flow of liquid occurring through filter holder and media 3, conduit 4', valve 15, pump 14, valve 16 and conduit 6a' into the container 8 during filtration of the liquid 2, and with flow occurring through conduit 10', valve 15, pump 14, valve 16 and conduit 12a' during backwash of the filter media.

Figure 3:
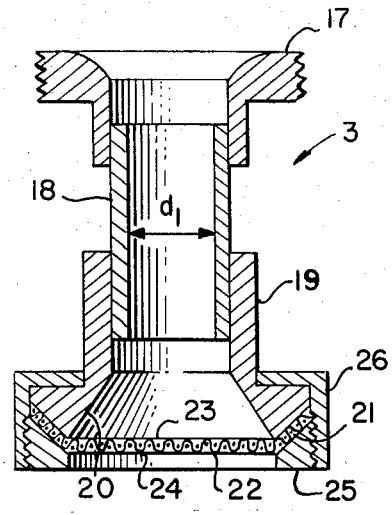
FIG. 3 is an enlarged sectional view in elevation of a first form of simplified filter media and holder according to the present invention and used in the apparatus of FIGS. 1 and 2.

A first form of filter media and holder as used in the apparatus of FIGS. 1 and 2 is illustrated in FIG. 3 and comprises, for example, an externally threaded flanged coupling ring 17 in which is fitted and suitably secured a relatively short section of pipe 18 having an inside diameter d1. A one-half inch N.P.T. cast steel slip ring type union 19 is fitted over the inlet end of pipe 18 and has a flared inlet end 20 defining a conically shaped inlet into the pipee 18. The inlet end of the union 19 is beveled at 21 to define a forwardly projecting, annular, conically shaped surface on the inlet end of the union 19. A suitable filter media 22 such as 37 micron, stainless steel, regular weave mesh is disposed or sandwiched between two 60 × 60 mesh stainless steel regular weave support or back-up screens 23 and 24. The filter media 22 is held in position across the inlet end of union 19 with its outer peripheral marginal edge portion in overlying relationship to the conically shaped surface 21 by means of a retaining ring 25 threaded into a coupling ring 26 for securely clamping the marginal edge portion of the filter media 22 between the retaining ring 25 and the end of union 19. The open area of the filter media 22 is substantially equal to the open or inlet area of the pipe 18 in order to reduce the resistance of the filter media to flow through the system, and the flared holder reduces jetting action during backwash and insures a uniform backwash flow over the whole filter media. The filter media 22 is disposed substantially in the plane of the end of the filter holder and about one-half inch from the end of inlet fitting so that contaminants may be readily removed from the filter media upon backwash of liquid through the filter media.

Figure 4:
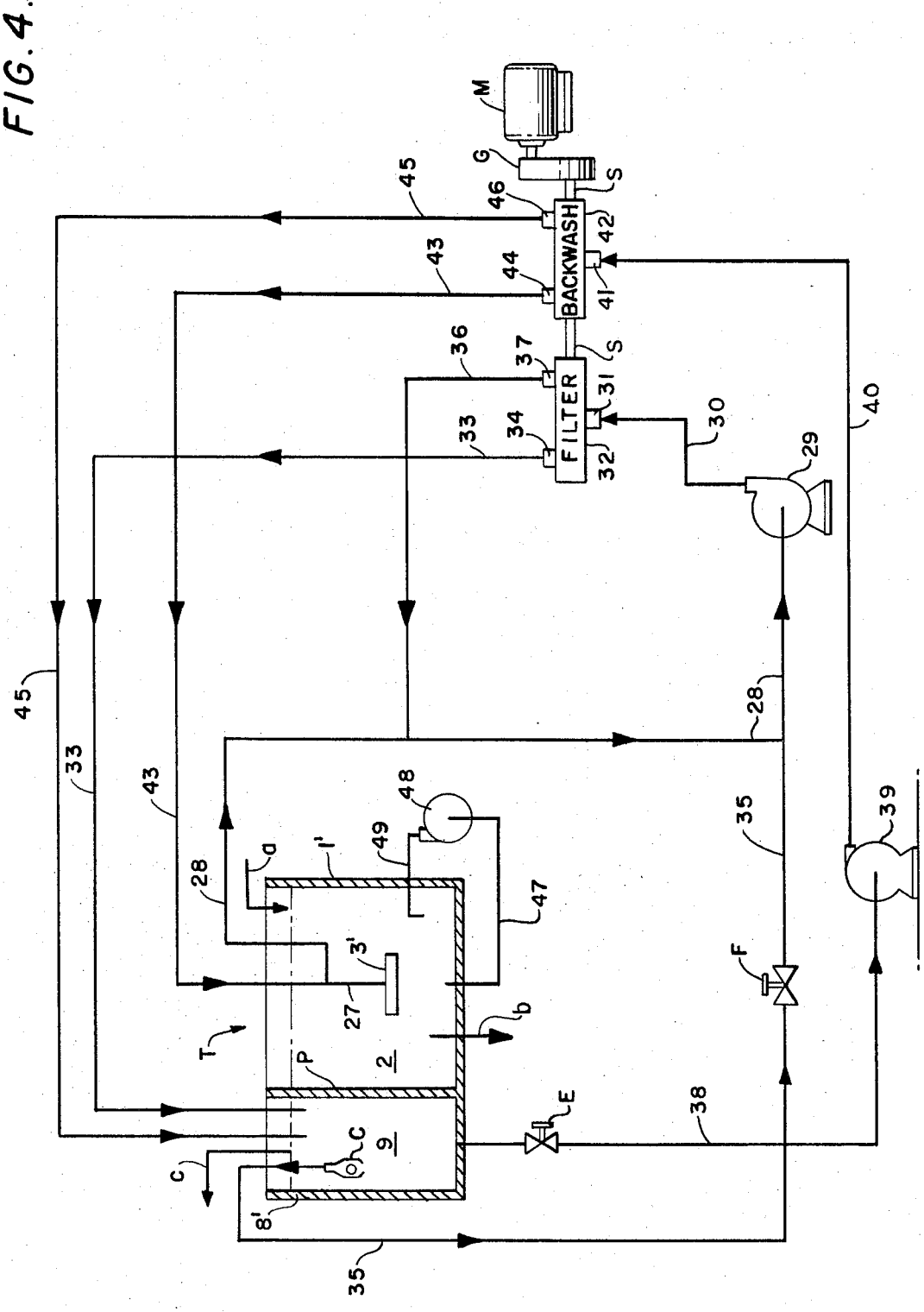
FIG. 4 is a detailed schematic view of a preferred construction of a two pump, two valve rapid cyclic filtering apparatus.

In FIG. 4, a preferred construction of a two pump, two valve filter apparatus comprises a tank T divided or separated by a partition P into a slurry containing compartment 1' and a filtrate containing compartment 8'. A filter holder and media 3' is positioned within a slurry 2 in the slurry compartment 1' and is secured to the end of a conduit 27. A conduit 28 is connected to conduit 27 at one end and to a pump 29 at its other end. A conduit 30 is connected with the outlet of the pump 29 at one end and with an inlet fitting 31 of a unique rotary valve 32. A conduit 33 is connected at one end with an outlet fitting 34 on the valve 32 and extends at its other end into the filtrate compartment 8' for discharging filtrate 9 into the compartment.

A bleed line or conduit 35 is connected at one end with a check valve C disposed within the filtrate 9 in filtrate containing compartment 8' and is connected at its other end with the conduit 28. An adjustable valve F is in the conduit 35 for adjusting the amount of flow through the bleed line 35 to prevent cavitation of the pump 29 under certain conditions whereat pressure losses on the suction side of the filter 3' may otherwise cause cavitation of the pump 29. Further, a conduit 36 is connected at one end with a second outlet fitting 37 on the valve 32 and at its other end with the conduit 28 for by-passing fluid during a backwash operation.

For backwash of the filter media, a conduit 38 is connected at one end with the filtrate compartment 8' and at its other end with the inlet of pump 39, and an adjustable valve E is in the conduit 38 to adjust the amount of backwash per revolution. A conduit 40 is connected at one end with the outlet of the pump 39 and at its other end with an inlet fitting 41 of a unique rotary valve 42 substantially identical to the valve 32. A conduit 43 is connected at one end with an outlet fitting 44 on the valve 42 and at its other end with the conduit 27 to flow filtered liquid reversely through the filter media to backwash the filter media.

Another conduit 45 is connected with another outlet fitting 46 on the valve 42 and extends to the filtrate compartment 8' to discharge filtrate back into the compartment in a by-passing operation while the slurry is being filtered.

The valves 32 and 42 are connected together for simultaneous operation and are operated or caused to be rotated by means of a shaft S connected to each of the valves and to a suitable gearing G driven from a suitable motor M, such as a two horsepower Ratiotrol variable speed motor connected through the gearing G to produce a rotational speed of the valves of from 0 to 450 rpm. Both valves in this apparatus are located on the pressure side of their respective pumps such that liquid is bypassed through the valves when they are not involved with moving liquid to and from the filter media, and this relieves the shock and wear on the pumps, as they are essentially always operating at the same capacity.

All the conduits used in the FIG. 4 apparatus preferably comprise flexible 1¼ inch polyethylene hose to prevent or reduce hydraulic shock on the system as the valves are rapidly cycled and flow diverted from one conduit to the other.

In a preferred construction, the pumps 29 and 39 are JABSCO JD three-fourths inch flexible impeller pumps, preferably driven by a suitable motor means (see FIG. 6), such as a one horsepower electric motor.

In operation of the FIG. 4 apparatus, during the filtration stage, the valves 32 and 42 are rotated into a filtering position, with communication between conduits 30 and 33, and between conduits 40 and 45. The filter pump 29 draws dirty liquid toward the filter media, which filters out the solids, and then the pump discharges the filtered liquid into the filtrate compartment 8' via the conduit 28, pump 29, conduit 30, valve 32 and conduit 33. If the valve F in the bleed line 35 is open, liquid is also drawn from the filtrate compartment 8' and discharged back into the filtrate compartment through conduit 35, valve F, conduit 28, pump 29, conduit 30, valve 32 and conduit 33. At the same time, the backwash pump 39 is drawing filtered liquid from the filtrate compartment 8' through conduit 38, pump 39, conduit 40, valve 42 and conduit 45 back into the filtrate compartment 8' in a by-passing operation.

When the valves 32 and 42 have been rotated into a backwashing position, communication is established between conduits 30 and 36 in a by-passing operation, and between conduits 40 and 43 for the backwash portion of the cycle and filtrate is drawn from the filtrate compartment 8' through conduit 38, pump 39, conduit 40, valve 42 and conduit 43 into conduit 27 and reversely through filter media and media holder 3' to backwash the filter. At the same time, the filter pump 29 by-passes liquid through outlet 37 and conduit 36 back into conduit 28 and through the pump 29 again. The check valve C in conduit 35 prevents reverse flow of liquid through the bleed line during this portion of the cycle and thus the liquid by-passes in a closed loop through the filter pump and ports 37 of the filter rotary valve.

These steps are continuously repetitive with each revolution of the valves and a cycle consists of one filtration step followed by one backwash step. As explained below in greater detail, the valves are constructed such that the ratio of filtration time to backwash or non-filtration time is substantially greater than 1:1 and not greater than 15:1, and the rotational speed of the valves is such that a filtration step is carried on from about 0.0001 seconds to about 1.0 second and a backwash step or total non-filtration cycle portion is carried on from about 0.0001 second to about 1.0 second. The rotary pumps and rotary valves effect substantially constant flow rates during the filtration and backwash portions of the cycle, and the change in flow from a forward direction to a reverse direction and vice versa is effected substantially instantaneously by the rotary valves and constantly operating rotary pumps.

To maintain the solids dispersed in the liquid in the slurry 2, a conduit 47 is connected with the slurry compartment 1' and with a suitable pump 48 and back through a conduit 49 into the slurry compartment 1' to circulate and mix the slurry in the slurry compartment. The pump 48 preferably comprises a 1½ horsepower centrifugal pump in the preferred construction of the FIG. 4 apparatus.

Figure 5:
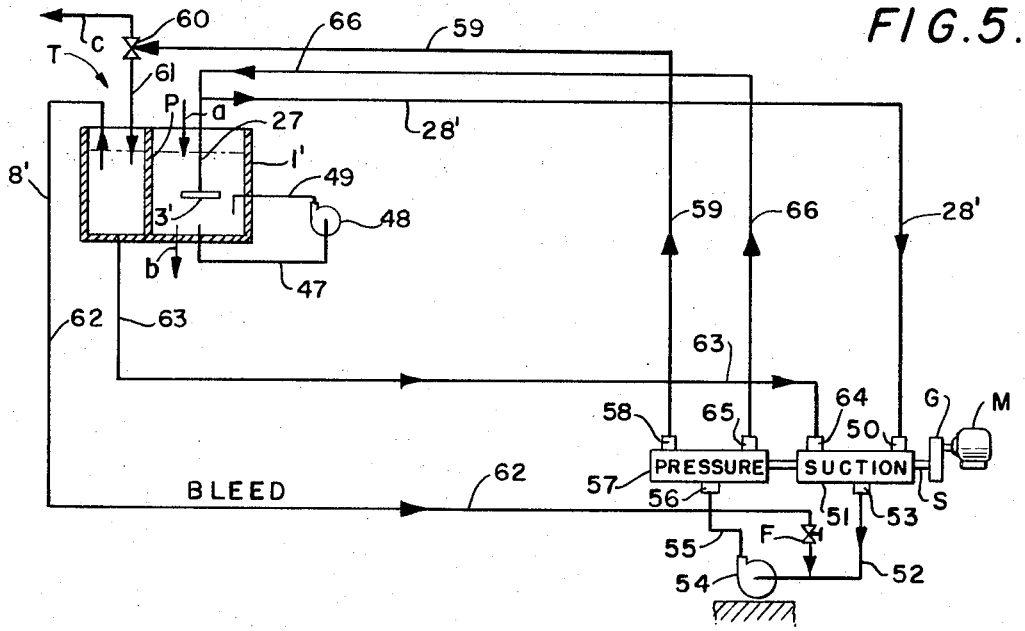
FIG. 5 is a detailed schematic view of a preferred construction of one pump, two valve rapid cyclic filter apparatus.
Figure 6:
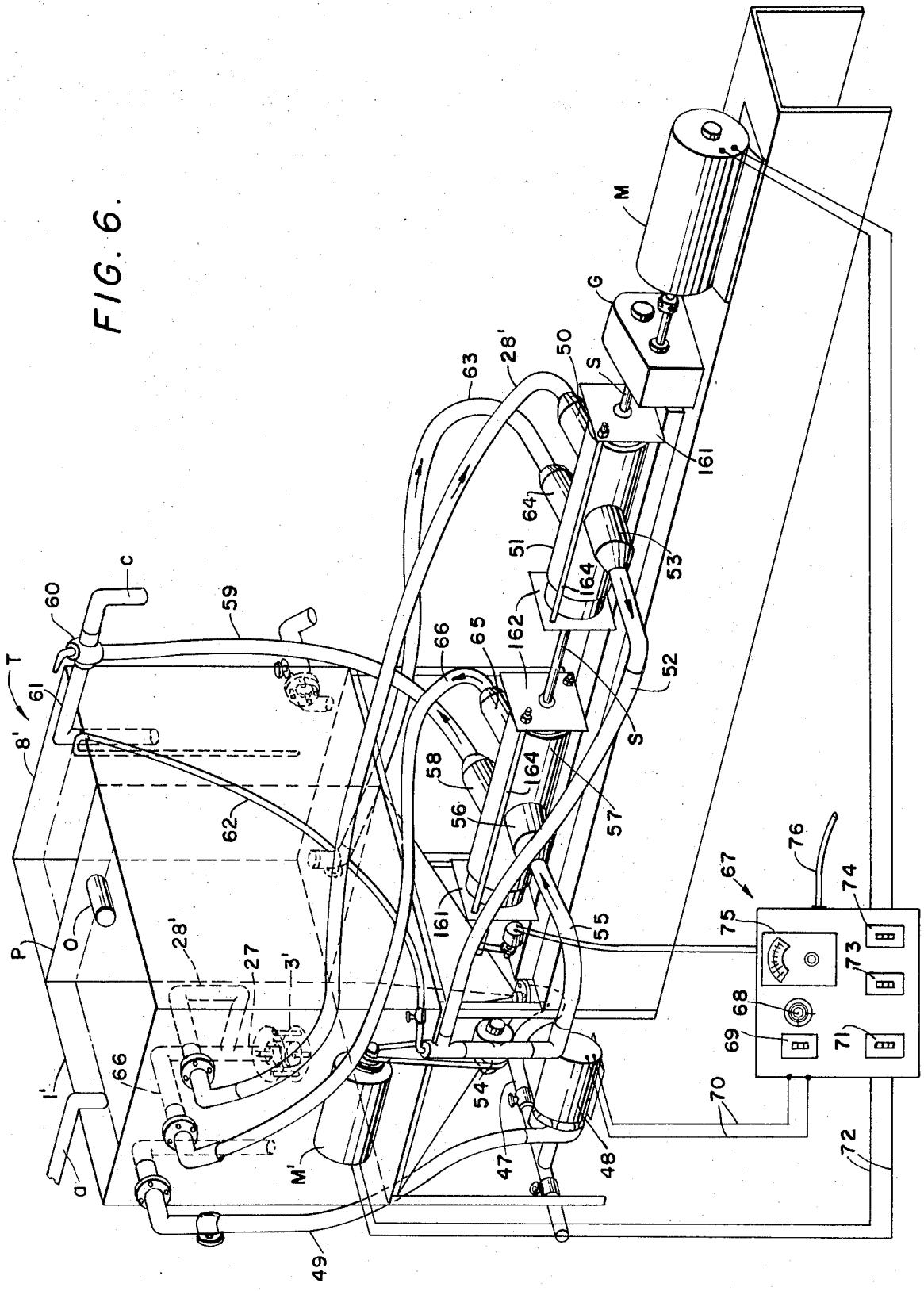
FIG. 6 is a perspective view of the one pump, two valve apparatus of FIG. 5.

A one pump, two valve filtering apparatus is illustrated diagrammatically in FIG. 5 and in perspective in FIG. 6. In this arrangement, the capital equipment required is less than in the two pump system of FIG. 4, and energy and equipment are not wasted in inefficient, expensive bypassing operations. In the FIGS. 5 and 6 arrangement, one rotary valve 57 is connected to the pressure side or outlet of the pump and another rotary valve 51 is connected to the suction or inlet side of the pump.

A conduit 28' is connected at one end with the conduit 27 and filter holder and media 3' in the slurry compartment 1' of tank T as in FIG. 4, but conduit 28' then extends at its other end to an inlet fitting 50 on the unique rotary valve 51, constructed substantially identically to the valves 32 and 42 in the previous embodiment. A conduit 52 is connected at one end with an outlet fitting 53 on the valve 51 and at its other end with the inlet to a pump 54. A conduit 55 extends from the outlet of the pump to an inlet fitting 56 on the second unique rotary valve 57 and thence through an outlet fitting 58 on the valve to a conduit 59 and through a suitable three-way valve 60 in a conduit 61 whereby the filtered liquid may be diverted either into the filtrate compartment 8' or to a point of use.

A bleed line 62 is connected at one end with the filtrate compartment 8' and at its other end with the conduit 52 to prevent cavitation of the pump upon pressure losses that may occur on the suction side of the filter, and an adjustable valve F is in the bleed line to adjust the amount of bleed.

To backwash the filter 3', a backwash conduit 63 is connected with the filtrate compartment 8' and with an inlet fitting 64 on the valve 51, and thence through the conduit 52 and pump 54 and conduit 55 to valve 57. From the valve 57, the liquid flows through an outlet fitting 65 and conduit 66 and back to conduit 27 to backwash filtered liquid through the filter holder and media 3'.

The conduits in this form of the invention likewise comprise 1¼ inch flexible polyethylene hose, and the motor and gearing and valves are substantially identical to those of FIG. 4. The pump 54 likewise comprises a JABSCO JD three-fourths inch flexible impeller pump.

A media diameter of 1½ to 2 inches is optimum for the one pump system of FIGS. 5 and 6, and at a backwash volume of 75 to 150 ml, with a ratio of media open area to inlet open area in the range of 0.5 to 1.2, a ratio of net flow of slurry to net flow of clean liquid through a clean filter in the range of 0.71 to 0.86 is obtained.

A suitable control means 67 is connected with the motors of the system or apparatus of both FIGS. 4 and 5 and is described only in relation to FIG. 6, it being understood that a similar control means could be used in the FIG. 4 embodiment. The control means 67 includes a Ratiotrol motor speed control 68 for regulating the speed of the motors, a switch 69 connected through suitable electrical leads 70 to control operation of mixing pump 48, a switch 71 connected with the motor M' of filter pump 54 through suitable electrical leads 72 to control operation of the filter pump, and a pair of switches 73 and 74 connected with the motor M to conntrol the application of power and the speed of operation of motor M. A tachometer 75 is also provided for observing the speed of rotation of the valves, and a suitable cable or electrical lead 76 is connected with the control means 67 and extends to a suitable source of energy, such as 220 volts, single phase electrical energy.

In contrast to the two pump system of FIG. 4, there is no restriction in the backwash line 63 of the one pump system in FIGS. 5 and 6, and the motor M for rotating the valves 51 and 57 comprises a three horsepower Ratiotrol motor.

The gearing G in each of the FIGS. 4, 5 and 6 embodiments is preferably a 4.25:1 speed reducer. Moreover, as seen in FIG. 6, a net overflow line 0 is connected in the partition P between filtrate compartment 8' and slurry compartment 1' to return net overflow or excess filtrate from the filtrate compartment back to the slurry compartment.

In FIGS. 7 through 15, several types of filter media and filter media holders for use in the FIGS. 4, 5 and 6 apparatus are disclosed.

Figure 7:
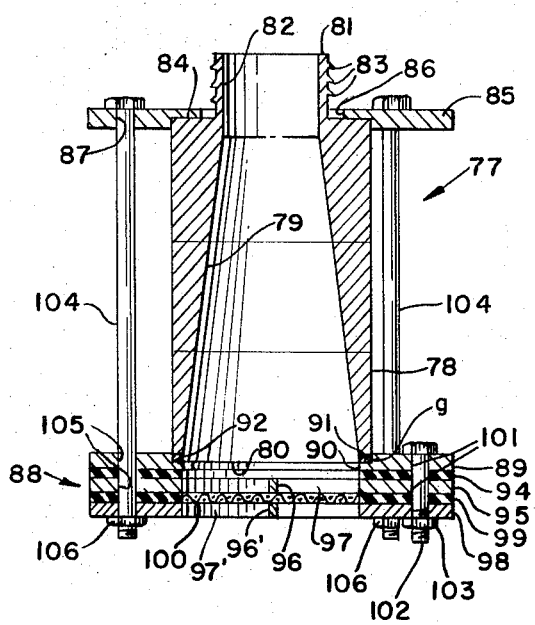
FIG. 7 is an enlarged view in section of a first modified filter holder and media used in the FIGS. 4, 5 and 6 apparatus.
Figure 9:
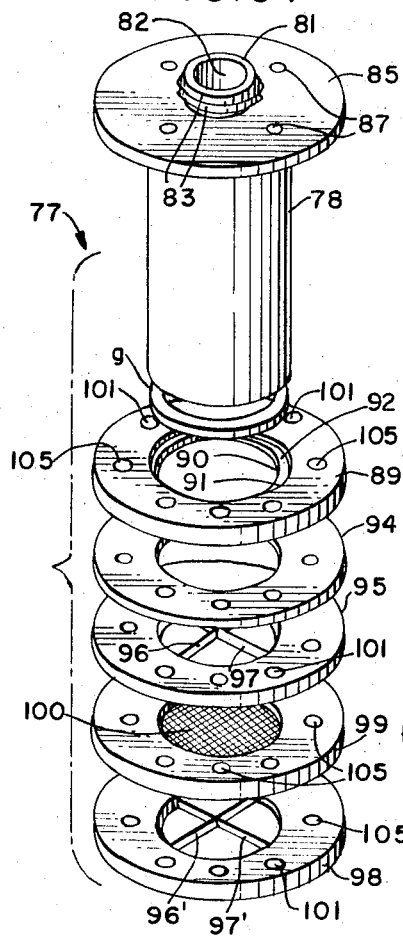
FIG. 9 is an exploded perspective view of the filter holder and media of FIG. 7.

In FIGS. 7 and 9, a first form of flared filter media holder 77 comprises an elongate tubular body 78 having an outwardly and downwardly flared or tapered bore 79 therein terminating at a lower open end 80. In a preferred construction, the bore 79 is flared an angle of about 7° to prevent "jetting" during backwash, and to insure a substantially evenly distributed flow of liquid reversely through the filter media. A reduced diameter, axially upwardly projecting neck 81 is on the upper end of the body 78 for attachment thereto of a conduit (such as conduit 27) and a cylindrical bore 82 extends through the neck and communicates with the upper end of the tapered bore 79. A plurality of serrations or threads or other suitable fastening means 83 are on the outer surface of the neck 81 for secure attachment thereto of the conduit means, and an annular, axially upwardly facing shoulder 84 is defined on the upper end of the body by the reduced diameter neck portion and body 78. An annular, ring-shaped collar 85, preferably of brass, and of substantially larger diameter than the body 78 and having a central opening 86 therethrough is positioned on the shoulder 84 at the upper end of the body. A plurality of openings 87 extend through the collar 85 in circumferentially spaced relationship therearound.

A first form of media retaining means 88 is secured at the lower end of the media holder body 78 and comprises a retaining plate 89 of substantially the same diameter as the collar 85 and having a stepped central opening 90 and 91 in the center thereof defining an axially upwardly facing shoulder 92 which is held against the end 80 of the body 78 and is sealed relatively thereto by means of an annular gasket g interposed between shoulder 92 and end 80. Opening 90 is of slightly greater diameter than the diameter of the flared bore 79 at the lower end 80 of the body 78.

An annular, ring-shaped gasket 94 of a suitable material such as rubber or plastic or the like and having the same inner and outer diameters as retaining plate or ring 89 is disposed in underlying contiguous relationship with plate 89.

An annular, ring-shaped rear or upper media support plate 95, preferably of brass, and having the same inner and outer diameters as gasket 94 and retaining plate 89, is disposed in underlying contiguous relationship with the gasket 94 and has a pair of crossed media supports 96 and 97 in the central opening therethrough.

A substantially identical front or lower media support or retaining plate or ring 98 having the same inner and outer diameters as support plate 95, and preferably of brass, is positioned below rear support plate 95, and has crossed media supports 96', 97' aligned with the supports 96, 97, and a suitable media gasket 99 is sandwiched between front and rear support plates 98 and 95.

A suitable filter media 100 is positioned in the center opening of media gasket 99 and is held between the media support plates 95 and 98 and between the support crosses 96, 97 and 96' and 97'.

A plurality of aligned openings 101 extend through the retaining plate 89, gaskets 94 and 99 and front and back support plates 94 and 98, and a plurality of bolts 102 are received through the openings in each of these members and a nut 103 is threaded thereon to securely clamp the retaining plates, gaskets, front and rear support plates, and media 100 together in assembled relationship. The assembled media retaining means 88 is then securely held against the end 80 of the media holder body 78 by means of a plurality of elongate bolts 104 extended through another set of aligned openings 105 extending through the retaining plates, gaskets, and front and rear support plates. Nuts 106 are threaded on the ends of bolts 104 beneath the media retaining means 88 to securely hold the media retaining means against the lower end of media holder body 78.

Figure 10:
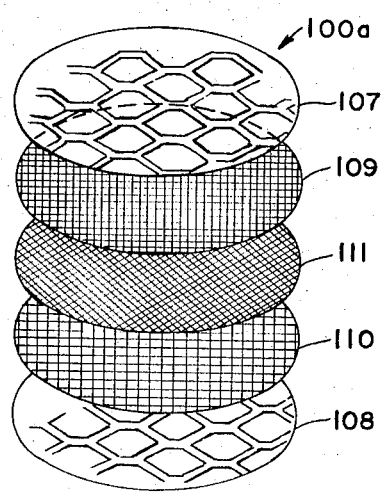
FIG. 10 is an exploded perspective view of a first filter media used in the holders of FIGS. 7, 8 and 9.

In FIG. 10, a first type of media 100a comprises a pair of upper and lower media support discs 107 and 108 of KP Galvanized expanded metal coated with nylon and having a 90 percent open area. A pair of 12 mesh, plain weave, stainless steel screen discs 109 and 110 are positioned between the media support discs 107 and 108 and have about a 52 percent open area. The media next includes a 37 micron, 400 mesh, plain weave, stainless steel wire cloth disc 111 having a 36 percent open area and sandwiched between the screens 109 and 110. The media 100a is assembled in the media gasket 99 and supported between the front and rear support plates 95 and 98 as seen in FIG. 7.

Figure 11:
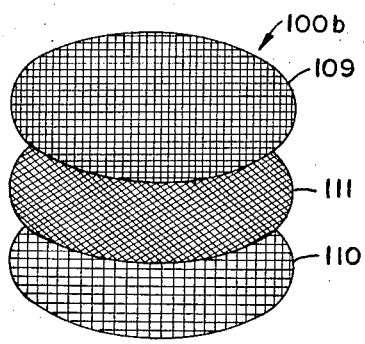
FIG. 11 is an exploded perspective view of a second filter media for use in the holders of FIGS. 7, 8 and 9.

In FIG. 11, a second type of media 100b comprises a pair of 12 mesh, plain weave, stainless steel screens 109 and 110 having a 37 micron, 400 mesh, plain weave, stainless steel wire cloth 111 sandwiched therebetween, as in the FIG. 10 embodiment, but absent the galvanized expanded metal support discs 107 and 108.

Figure 12:
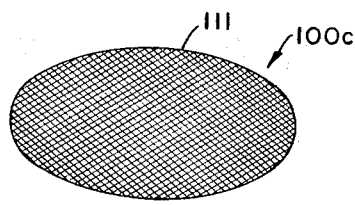
FIG. 12 is a perspective view of a third filter media used in the holders of FIGS. 7, 8 and 9.

In FIG. 12, a third type of media 100c comprises only the 37 micron, 400 mesh, plain weave, stainless steel wire cloth 111.

Figure 13:
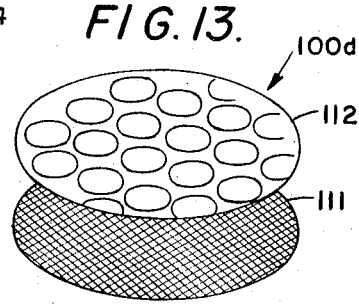
FIG. 13 is an exploded perspective view of a fourth filter media used in the holders of FIGS. 7, 8 and 9.

A fourth type of media 100d in FIG. 13 comprises a galvanized metal perforated plate 112 having a 75 percent open area and 0.010 inch thick positioned above and in overlying relationship to the 37 micron, 400 mesh, plain weave, stainles steel wire cloth 111.

Figure 14:
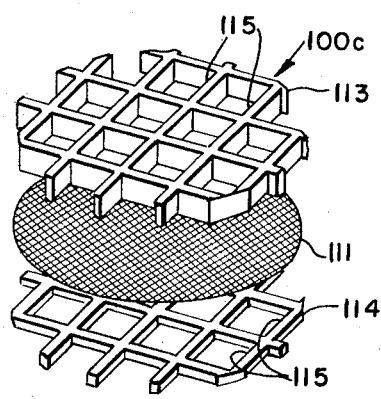
FIG. 14 is an exploded perspective view of a fifth and preferred filter media used in the holders of FIGS. 7, 8 and 9.

In FIG. 14, a fifth and preferred type of media 100e is illustrated and comprises a pair of upper and lower stainless steel, perforated plates 113 and 114 having one-fourth inch holes 115 therethrough and each with about a 75 percent open area, but with the upper plate 113 having an axial dimension or thickness of 0.109 inch and the lower plate or disc having an axial dimension or thickness of 0.031 inch. The 37 micron, 400 mesh, plain weave, stainless steel wire cloth 111 is supported between the upper and lower perforated plates 113 and 114.

Figure 8:
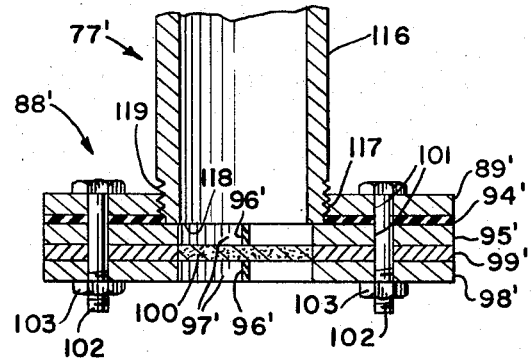
FIG. 8 is an enlarged fragmentary sectional view of a second modified filter holder and media used in the FIGS. 4, 5 and 6 apparatus.
Figure 15:
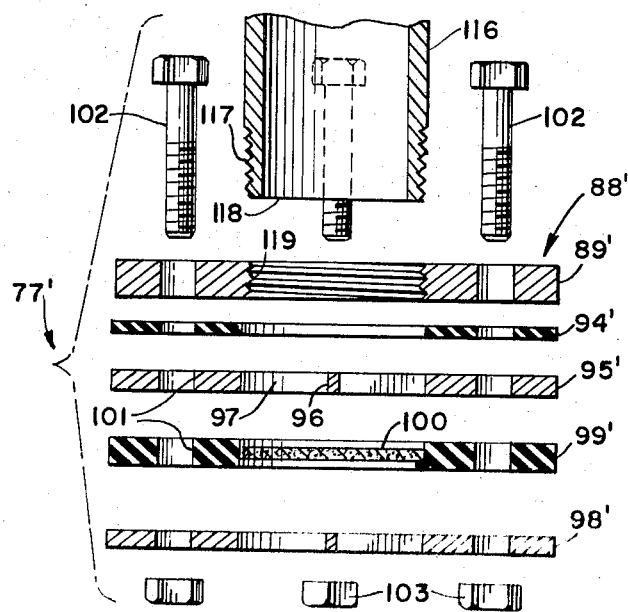
FIG. 15 is a fragmentary enlarged exploded view in section of the filter media holder and media of FIG. 8.

In FIGS. 8 and 15, a second type of media holder 77' comprises a 1 inch schedule 80 inlet pipe 116 having external threads 117 on the lower end 118 thereof for cooperative threaded engagement with internal threads 119 in a modified retaining plate 89' of a modified media retaining means 88'. The modified media retaining means 88' includes the threaded retaining plate 89', preferably of brass, a gasket 94', upper and lower media support plates 95' and 98' and a media gasket 99' and media 100 sandwiched between the upper and lower media support plates.

The modified media retaining means 88' is held in assembled relationship by means of a plurality of bolts 102 extended through aligned openings 101 through the retaining plates, gaskets, and front and rear support plates, as in the previous holder 77, and is secured to the fitting 116 by threaded engagement of the threads in plate 89' with threads 117 on fitting 116.

Any one of the filter media illustrated in FIGS. 10 through 14 can be used with the modified filter media holder 77' of FIGS. 8 and 15, if desired.

In FIGS. 16 through 21, one of the rotary valves used in any of the FIGS. 4, 5 and 6 apparatus is illustrated, and since the valves are substantially identically constructed, only one valve, 57, will be described in detail, it being understood that all of the valves 33, 42, 51 and 57 are substantially the same, with the ports at adjacent ends of adjacent valves having a corresponding size to yield similar flow rates. Also, the ports in valve 51, for example, adjacent the ends thereof are inlet ports rather than outlet ports as in valve 57, described below, and the port at the midportion of valve 51 is an outlet port rather than an inlet port as in valve 57. Similar remarks apply with respect to the other valves, it being understood that the designation of inlet and outlet ports depends on the particular connection of the valves in the apparatus.

The valve 57 includes an elongate cylindrical body 120 having a bore 121 therethrough. A pair of outlet ports 122 and 123 are in the side of body 120 on one side thereof and in spaced relationship and an inlet port 124 is in the side of body 120 approximately medially of the ends thereof and on the opposite side of the body from outlet ports 122 and 123. The ports 122 and 123, in a preferred construction, are 3 inches long by one-fourth inch wide, and the port 124 is 1½ inches long by 2 inches wide. The outer end of the fittings 56, 58 and 65 are provided with suitable connecting means such as internal threads 125 for attachment thereto of conduit means, such as 55, 59 and 66, respectively.

A hollow, rotatable valve core or sleeve 126 is rotatably fitted within the bore 121 in body 120 for controlling flow through the ports 122, 123 and 124. The valve core 126 has opposite, closed ends 127 and 128 with central apertures or openings 130 therethrough through which the shaft S extends, the valve core being suitably fixed to the shaft for rotation therewith.

The valve core or sleeve 126 has an elongate, substantially rectangularly shaped port 131 therein adjacent one end thereof adapted to be rotated into registry with port 122, and an elongate, substantially rectangularly shaped port 133 therein adjacent the other end thereof, and on the opposite side of the core from port 131, adapted to be rotated into registry with port 123 and of a predetermined smaller size than port 131. The dispostion of port 133 on the opposite side of the core from port 131 results in alternating flow through the ports as the core is rotated. In a preferred embodiment of the invention, the port 131 is larger than port 133 by an amount sufficient to obtain flow through the port 131 and fitting 58 for approximately three-fourths of one revolution and flow through port 133 and fitting 65 for approximately one-fourth of one revolution, or in other words, flow occurs through fitting 58 3 times as long as it occurs through fitting 65.

It is important to note that the core in adjacent valve 51 is arranged such that the smaller port therein, corresponding to the port 133, is at the end of the valve 51 adjacent the end of the valve 57 in which the smaller port 133 is positioned, such that a substantially identical flow rate is obtained through conduit 63 as through conduit 66 in the respective cycle portions.

The outer surface of the core has a reduced diameter mid-portion 135 spaced radially inwardly from the inner wall of the valve body 120, and a plurality of closely spaced, rectangularly shaped inlet ports or openings 136 are in the reduced diameter portion 135 in registry with the inlet port 124 through the valve body 120. Upon rotation of the valve core, at least one of the inlet ports 136 is always in communication with the inlet port 124 and the inlet fitting 56 on the valve body, and alternate ones of the outlet ports 131 and 133 are alternately in communication with outlet ports 122 and 123, such that during approximately three fourths of a revolution of the valve core, and during the filtering portion of the cycle, flow occurs inwardly through inlet fitting 56, inlet port 124 and one of the inlet openings 136 and outwardly through the outlet port 131 in the valve core and then outwardly through outlet fitting 58, and during the backwash portion of the cycle, flow occurs from the valve core through port 133 and through fitting 65 for approximately one fourth of one revolution.

The valve core or sleeve 126 is maintained in the valve body 120 by means of a pair of body end caps 137, 138 each having a bore 139, 140 therethrough, respectively, and a reduced diameter end portion 141, 142, respectively, having annular grooves 143, 144 therein in which are positioned O-rings 145, 146. The reduced diameter end portions 141, 142 are disposed in the opposite end portions of the bore 121 of the valve body 120 and the O-rings 145, 146 effect a fluid tight seal between the end caps and the valve body.

Annular, radially inwardly projecting shoulders 147 and 148 are in the bores 139, 140 defining reduced diameter openings 149, 150 through the caps and through which the shaft S extends. The shaft S is sealed relative to the body end caps 137, 138 by means of mechanical seals 151, 152 and 153, 154, positioned on opposite sides of the shoulders 147, 148, respectively, and in surrounding relationship to the shaft S within the bores 139, 140 through the body end caps 137, 138, respectively. Each of the mechanical seals comprises an annular, ring-shaped mechanical seal seat 155 disposed in surrounding relationship to the shaft S and positioned against one side of the shoulders 147, 148 within the bore 139, 140, and mechanical seal bodies 156 of substantially cylindrical configurations also positioned within the bore 139, 140 and disposed in abutting engagement with the seal seat 155. The outer seal bodies 156 are maintained in tight abutting engagement with the outer seal seats 155 by means of seal tension retainers 157, 158 of cylindrical configuration, positioned over the shaft S outwardly of the outer mechanical seal bodies 156 and secured in abutting engagement with the seal seats by means of set screws 159, 160 extending through the seal tension retainers and against the shaft S. A pair of substantially flat, square-shaped body retainer plates 161, 162 having central openings 163 and 164 therethrough are positioned in clamping engagement against the outer ends of the body end caps 137, 138 at opposite ends of the valve body 120, and a plurality of elongate retaining bolts 165 extend through openings adjacent each corner of the body retaining plates at opposite ends of the valve body, and nuts 166 are threaded over the outer end of the elongate retaining bolts 165 to securely clamp the body retaining plates 161, 162 against the outer end of the body end caps to thus hold the body end caps, inner mechanical seals and valve core securely positioned within the bore 121 in the valve body 120.

In a preferred construction, the seal tension retainers 157, 158 are made of brass and the mechanical seals 151, 152, 153 and 154 are Garlock type PK Mechanipak seals. The body retainer plates 161, 162 and the retaining bolts 165 comprise mild steel, and the body end caps comprise brass.

Figure 22:
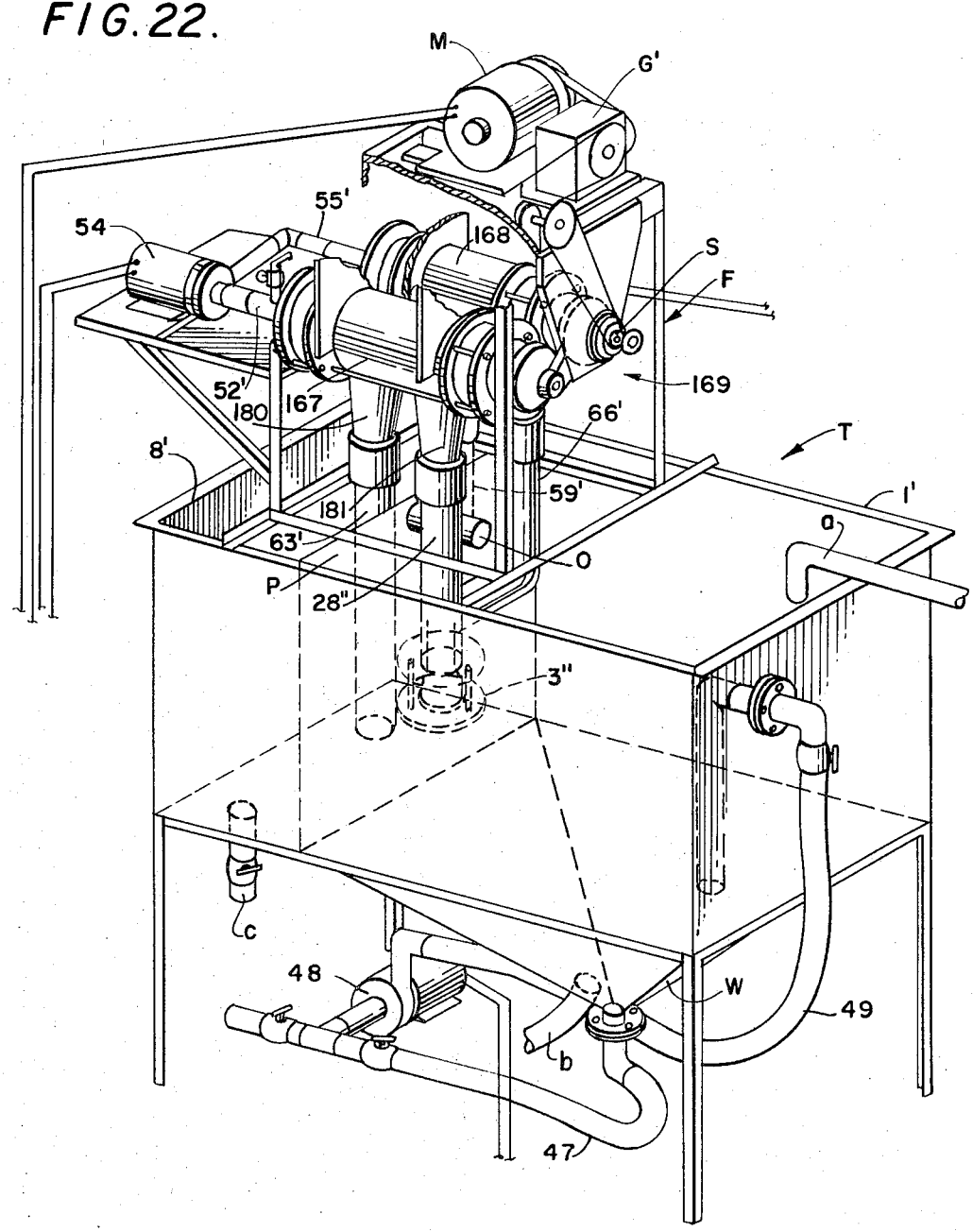
FIG. 22 is a perspective view, with portions broken away, of a modified one pump, two valve filter apparatus.
Figure 23:
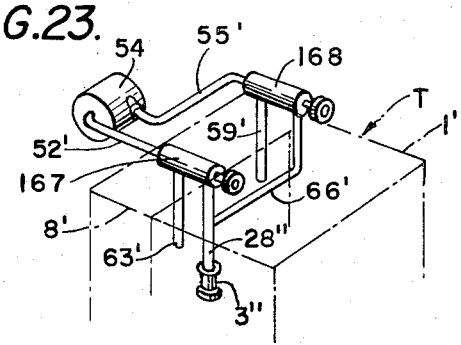
FIG. 23 is a schematic perspective view of the modified one pump, two valve apparatus of FIG. 22.

A modification of the one pump, two valve system of FIG. 6 is illustrated in FIGS. 22 and 23 and comprises a tank T substantially identical to the tank T in FIG. 6 and divided by a partition P into a filtrate chamber or compartment 8' and a slurry compartment or chamber 1'. The slurry compartment or chamber has a downwardly tapered and pointed bottom wall W connected through conduits 47 and 49 with a mixing pump 48 for maintaining the slurry in the slurry compartment 1' in a stirred or mixed condition.

A pair of modified rotary valves 167 and 168 are mounted on a suitable frame F supported on top of the tank T for controlling flow of liquid between the compartments 1' and 8' and through the filter media 3'', filter pump 54 and conduits 28'', 52', 55', 59', 63' and 66'.

A motor M is connected through a 20:1 speed reducer G' and through a series of suitable pulleys and gears 169 to the shafts S of the valves 167 and 168 to cause desired rotation of the valve cores within the valves to control the flow of liquid therethrough. The motor M has a variable pitch pulley and belt arrangement connected with the 20:1 speed reducer G', and the belt and gear arrangement 169, in conjunction with the motor M and speed reducer G', is such as to achieve a range of rotational speeds of from 30 to 600 rpm of the valve shafts S.

The apparatus of FIG. 22 is much more simple and economical than the apparatus of FIGS. 4 and 6 for example, and in the apparatus of FIG. 22, the conduits are much shorter than the conduits of the previous embodiments and the valves have one of the ports extending axially through one end thereof rather than with all three of the ports extending through the side wall of the valves as in the previous embodiments. This results in a much more compact arrangement with reduced pressure losses and more efficient operation.

In the form of the invention illustrated in FIG. 22, there is no need for a bleed line connected with the pump in order to prevent cavitation of the pump as is necessary in the previously described embodiments.

In the apparatus of FIG. 22, during the filtration portion of the cycle, the valves 167 and 168 are in a position such that flow is caused to flow from slurry tank or compartment 1' through filter media 3'' and conduit 28'' into valve 167 and thence outwardly through the end thereof into conduit 52' and to the suction side of filter pump 54. The liquid is pumped by the pump 54 through conduit 55' and inwardly through the end of valve 168 and thence downwardly through conduit 59' and to the filtrate tank or compartment 8'.

During the backwash portion of the cycle, the valves are positioned such that flows occurs from the filtrate tank 8' through conduit 63' into the valve 167 and thence through suction line 52' into the pump 54 and out from the pump through conduit 55' into valve 168 and thence downwardly through conduit 66' and into conduit 28'' above filter media 3'' and through the filter media 3'' to backwash the filter media and fluidize the body of solids or contaminants in front of the filter media. The ratio of flow during filtration time to flow during non-filtration time is greater than 1:1 and not greater than 15:1, and in one example is about 3:1.

Several types of filter media used with the apparatus of FIG. 22 are illustrated in FIGS. 24 through 28.

Figure 24:
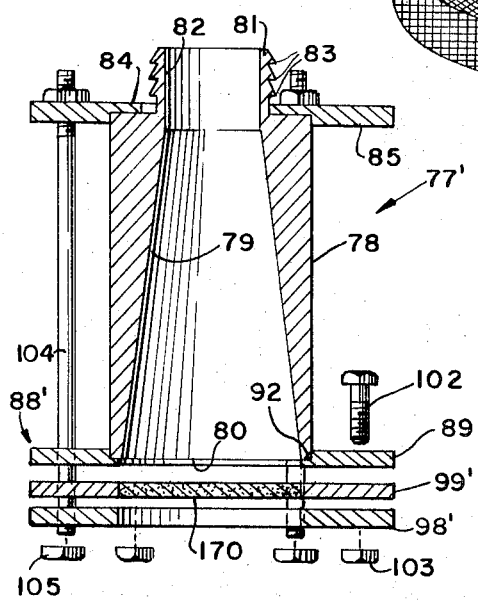
FIG. 24 is an exploded enlarged view in section of a first modified filter holder and media used in the modified filter apparatus of FIGS. 22 and 23.

In FIG. 24, a filter media holder and filter media 77' substantially identical to the previously described filter media holder 77 comprises a media holder body 78 having a flared bore 79 therethrough opening downwardly through the lower end 80 of the body, and having an upwardly projecting neck 81 thereon with a plurality of threads or serrations or the like 83 on the outer surface thereof for cooperation with conduit means.

Figure 28:
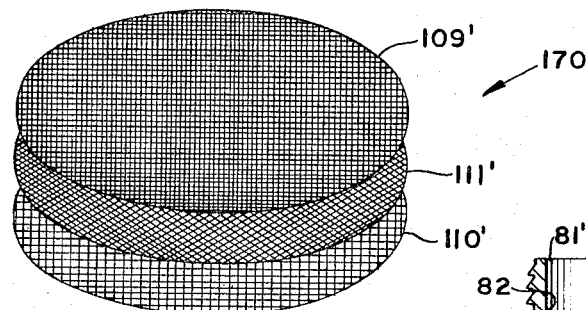
FIG. 28 is an enlarged perspective exploded view of a preferred filter media for use in the holder and the apparatus of FiGS. 22 and 23 and is shown with the holder in FIG. 24.

A media retaining means 88' comprising a media retaining plate 89 substantially identical to the previously described retaining plate is engaged against the lower end 80 of the body 78 and is held thereat by means of elongate bolts 104 and nuts 105 as in the previous embodiment. A filter media gasket 99' of annular, ring-shaped configuration is disposed immediately beneath and in engagement with the retaining plate 89 and a filter media 170, as illustrated in FIG. 28, is supported in the central opening through the media gasket 99'. A front retaining plate 98' is positioned beneath the media and media gasket and is held upwardly against the media and media gasket by means of a plurality of bolts 102 and nuts 103.

As seen in FIG. 2B, the media 170 comprises a Bendix diffusion bonded media consisting of a 20 micron, dutch twilled weave, stainless steel 165 × 800 mesh cloth 111' sandwiched between a pair of stainless steel, 10 × 10 mesh wire screens 109', 110', the screens 109' and 110' each having about a 56 percent open area. The screens and stainless steel mesh cloth are metallurgically bonded together.

Figure 25:
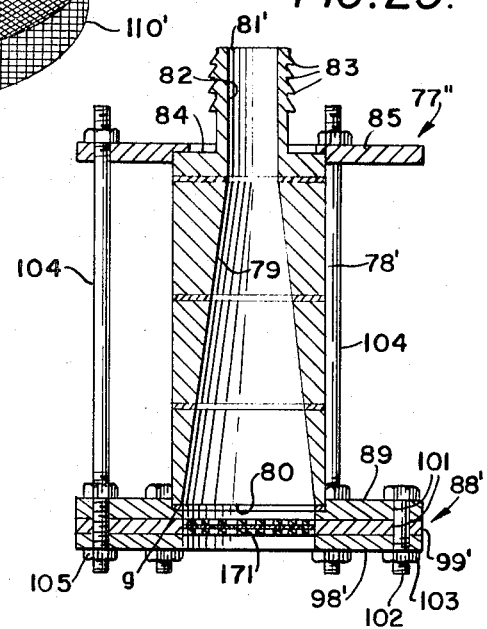
FIG. 25 is an assembled enlarged view in section of a second modified filter holder and media used in the modified apparatus in FIGS. 22 and 23.

In FIG. 25, a further form of media holder and filter media 77'' is illustrated and comprises a filter media body 78' similar to the filter media body previously described and having a flared bore 79 therethrough, and an open lower end 80. A relatively elongate neck 81' extends upwardly from the upper end of body 78' and a plurality of serrations or teeth 83 are on the outer surface thereof for cooperation with a suitable conduit means connected thereto. A collar 85 is engaged with a shoulder 84 at the upper end of the body 78' and a plurality of elongate bolts 104 extend downwardly therethrough and downwardly through a media retaining means 88' engaged and supported at the lower end of the body 78' by the bolts 104 and nuts 105.

The media retaining means 88' comprises a retaining plate 89 and front support plate 98' as in the FIG. 24 embodiment, with a media gasket 99' sandwiched therebetween as in the previous embodiment. The retaining plate, front support plate and media gasket are all held in assembled relationship by means of a plurality of bolts 102 and nuts 103.

Figure 27:
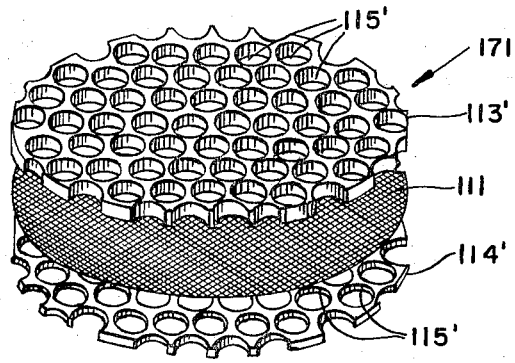
FIG. 27 is an enlarged perspective exploded view of a first filter media used in the holder and the apparatus of FIGS. 22 and 23 and is assembled in the holder in FIG. 25.

A modified filter media 171 is supported in the media gasket and as seen in FIG. 27, comprises an epoxy bonded media consisting of either a 37 micron, 400 mesh, plain weave, stainless steel wire cloth or a 40 micron, dutch twilled weave, stainless steel wire cloth, 111, sandwiched between a pair of stainless steel, perforated plates 113', 114' with openings 115' therethrough, and each having a 75 percent open area. The upper plate 113' is approximately one-eighth of an inch thick and has nine thirty-seconds of an inch diameter holes 115' therethrough whereas the lower plate 114' is one thirty-second of an inch thick.

Figure 26:
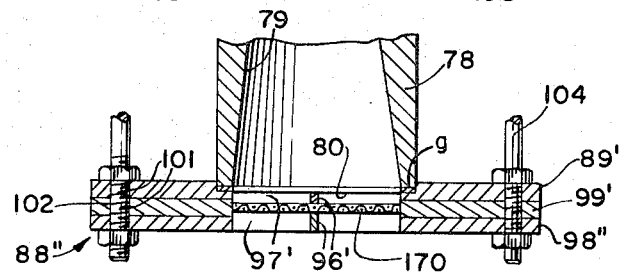
FIG. 26 is a greatly enlarged fragmentary sectional view of a third modified and preferred filter holder and media used in the apparatus in FIGS. 22 and 23.
Figure 30:
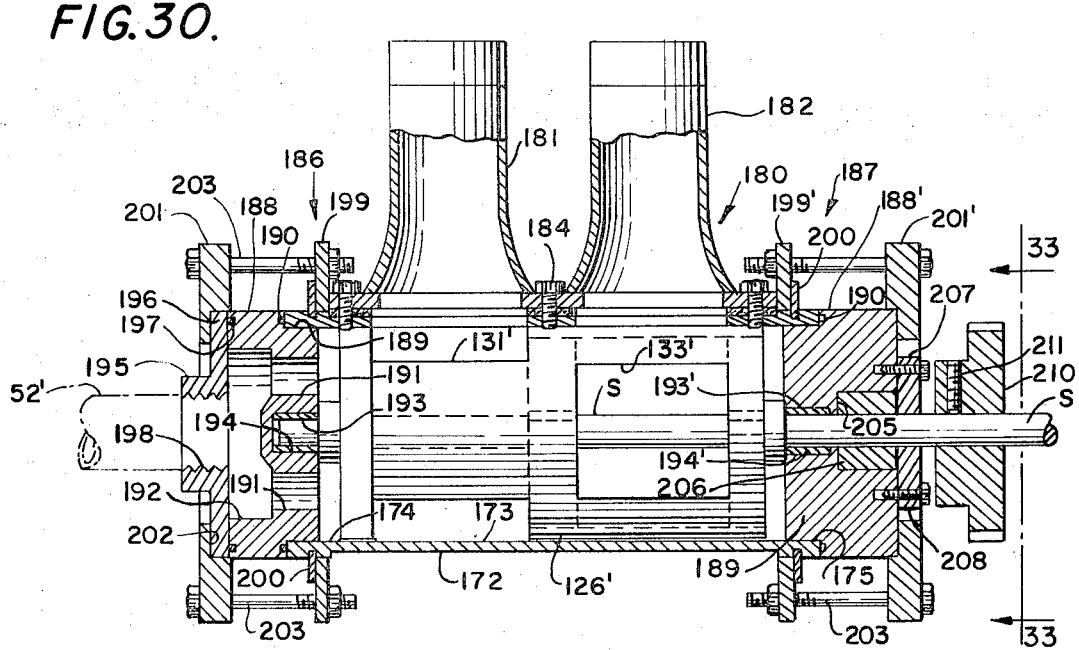
FIG. 30 is an assembled view in section of the valve of FIG. 29.
Figure 31:
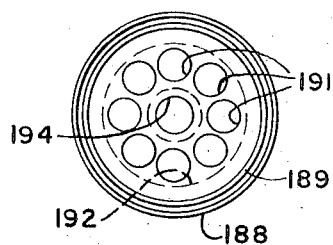
FIG. 31 is an end view of the inlet body end cap on the valve and is taken along line 31—31 in FIG. 29.
Figure 32:
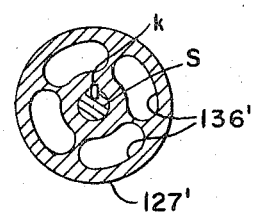
FIG. 32 is a view in section taken along line 32—32 in FIG. 29.
Figure 33:
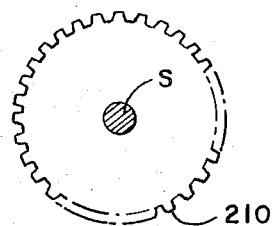
FIG. 33 is an end view of the valve of FIG. 30 and is taken along line 33—33 in FIG. 30.

In FIG. 26, the media holder 77' of FIG. 24 is shown and a Bendix diffusion bonded media 170 is supported in a modified and preferred media retaining means 88'' which is substantially identical to that illustrated in FIG. 24 except that the retaining plate 89' and front support plate 98'' have crossed supports or spider means 96' and 97' therein in supportive engagement with the filter media 170.

The filter or suction valve 167 used in the apparatus of FIG. 22 is illustrated in FIGS. 29–33. The pressure or backwash valve 168 is substantially identical to valve 167 and will not be described in detail. The only difference in the valves is in the mechanical seals used, and the suction valve 167 uses a double seal to effect a seal under vacuum service, while the pressure valve 168 uses a single mechanical seal to effect a seal for pressure service. The seals are described in greater detail below. The valve 167 comprises an elongate cylindrical valve body or casing 172 having a hollow interior or bore 173 therethrough, and opposite, open ends 174 and 175. A pair of circumferential, annular grooves 176 and 177 are in the outer and surface portions of the valve body 172 and the upper side of the valve body has a flattened surface or area 178 thereon on which is secured a suitable gasket 179 and inlet fitting or manifold port assembly 180, comprising a pair of inlet ports 181 and 182 integrally secured to a common base 183. The manifold and gasket are secured to the valve body 172 in any suitable manner, as for example by means of a plurality of bolts 184 threaded into tapped holes 185 in the valve body.

A modified hollow cylindrical valve core 126' is rotatably fitted with the body 172 and is shown in FIG. 29 rotated 180° relative to core 126 in FIG. 16. The core 126' has an inlet port 133' therein adjacent one end thereof, corresponding to the outlet port 131 in the previously described valve core 126, and an inlet port 131' therein adjacent the other end thereof and corresponding to outlet port 133 in the previously described embodiment. The port 131' is positioned angularly 90° relative to port 133' and the port 133' is larger than port 131'. Rather than the outlet ports 136 as in the previously described embodiment, a plurality of axial outlet ports 136' extend through the end wall 127' of the valve core so that liquid entering the valve through the ports 181 or 182 and valve core opening 131' and 133' flows axially through the valve core and through the outlet openings or ports 136.

The valve core 126' is held in position in the valve body 172 by means of body end cap assemblies 186 and 187 at opposite ends of the valve body, respectively, and is secured to the shaft for rotation therewith by any suitable means, such as key k.

The end cap assembly 186 at the outlet end of the valve body comprises a body end cap 188 having a reduced diameter end portion 189 thereon which fits within the open end 174 of body 172 and is sealed relative thereto by means of an O-ring 190. A plurality of apertures or openings 191 extend through the reduced diameter end portion for conveying fluid from the interior of the valve body to an enlarged outlet chamber 192 in the other end of the body end cap 188. A dry bearing 193 is fitted within a blind bore 194 in the center of the end cap 188 rotatably supporting the end of the shaft S. An inlet pipe fitting 195 having an enlarged radial flange 196 thereon is disposed in overlying relationship to the outer end of body end cap 188 and is sealed relative to the outer end of the body end cap 188 by means of an O-ring gasket 197 positioned in an annular groove in the outer end of the body end cap.

The inlet pipe fitting 195 is internally threaded at 198 for attachment thereto of conduit means 52'. The body end cap 188 and inlet pipe fitting 195 are maintained in position by means of a body retainer ring 199 positioned over the end of the valve body 172, and prevented from axial displacement from the valve body by means of an annular circlip 200 fitted within the annular notch 176, and a body retainer plate 201 having a radially inwardly directed flange 202 thereon disposed in overlying relationship to the body end cap, with the flange 202 abutting the outer marginal edge of flange 196 on the inlet pipe fitting, and a plurality of bolts 203 extending through aligned openings in the outer edge portions of the ring 199 and plate 201 to hold the plates, body end cap, and inlet pipe fitting in assembled relationship on the end of the valve body.

The other end of the valve body 172 is closed and sealed by a mechanical seal, which in this case, and as used, serves as a vacuum seal body end cap 188' having a reduced diameter end portion 189 fitted within the open end 175 of the body and sealed thereto by means of an annular O-ring 190. A dry bearing 193' is fitted within a bore portion 194' through the reduced diameter portion of the vacuum seal body end cap 188' and the shaft S is rotatably received and supported in the dry bearing. This seal could equally as well be used in pressure service, if desired.

An enlarged bore 204 extends inwardly of the vacuum seal body end cap 188' on the outer side thereof and terminates at its inner end in a shoulder 205. A vacuum seal 206 is fitted within the bore 204 and in engagement with the shoulder 205 and is maintained in position in the end of vacuum seal body end cap by means of a vacuum seal retaining plate 207 secured over the end of bore 204 by means of a plurality of bolts 208 extended through the retaining plate and into tapped bores 209 in the end of vacuum seal body end cap. The body end cap is maintained in position on the end of valve body 172 by means of a pair of spaced retaining plates 199', 201', circlip 200, and bolts 203.

A suitable drive gear 210 is secured to shaft S at the end of the valve body outwardly from the vacuum seal retaining plate and is held to the shaft a desired adjusted position by means of a set screw 211.

In a preferred construction, the body retainer plates 201, 201' are made of cadium plated stainless steel and have a diameter of approximately 8⅜ inches. the inlet pipe fitting 195 is a 1½ inch NPT fitting and the body end caps 188, 188' are of stainless steel. The drying bearings are Boston Gear No. P1216-8, and the body retainer rings 199, 199' are cadium plated mild steel. The valve body 172 and the manifold port assembly 180 are both made of stainless steel, and the valve core is made of Delrin. The gear means 210 is preferably a Boston Gear, YB-72.

The valve 168 is substantially identical in construction except that rather than the double mechanical seal means or vacuum seal means 187, a single mechanical seal means or pressure seal means 212 is used to effect a seal at the gear end of the valve.

Figure 34:
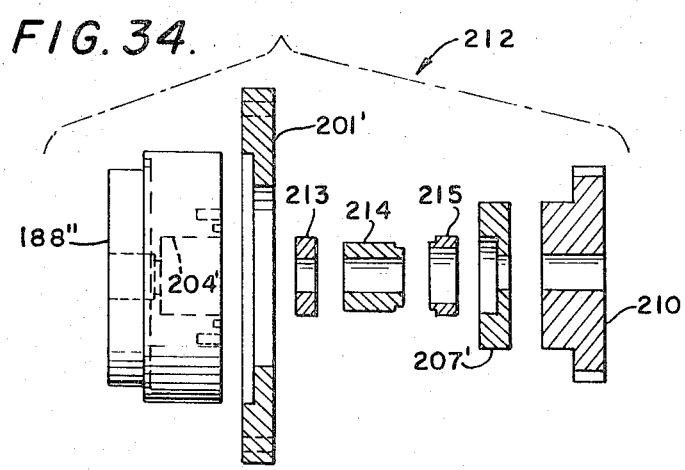
FIG. 34 is an enlarged exploded view in section of a modified seal body end cap and seal means for the valve of FIG. 30 used on the pressure side of the pump.

In FIG. 34, the pressure seal means 212 comprises a pressure seal body end cap 188" which is held against the end of valve body 172 by means of a pressure seal retainer plate 201'. A pressure seal spacer 213 of nylon or the like is positioned within the bore 204' in end cap 188" and a Garlock Type PK Mechanipak pressure seal body 214 is positioned within the bore 204' against the spacer 213. A pressure seal seat 215 is then positioned against the outer end of seal body 214 and a pressure seal retainer plate 207' of stainless steel or the like is secured to the end of pressure seal body end cap 188″ by means of a plurality of bolts as in the FIG. 30 embodiment, to hold the Mechanipak seal in operative position. The gear 210 is then affixed to the shaft S as in the FIG. 30 embodiment.

Further, in each of the forms of the invention, any suitable means is provided to introduce slurry into the slurry compartment, such as conduit a, for example, as shown in FIGS. 1, 2, 4, 5, 6 and 22, and any suitable means, such as conduit 6 may be used to remove contaminants from the slurry compartment. Also, suitable means such as conduit c may be used to withdraw filtrate from the filtrate compartment.

SUMMARY

In each of the embodiments of the invention disclosed herein, the ratio of filtration time to total non-filtration time per cycle of operation is substantially greater than 1:1 and is not greater than about 15:1, and in one example is about 3:1, and the ratio of media open area to filter housing inlet area is preferably between 0.5 and 1.20. Further, in each of the embodiments described, the filtration time per cycle is selected to be from 0.0001 second to about 1.0 second, and the non-filtration time is selected to be from about 0.0001 second to about 1 second to maintain a fluidized bed of solids in front of the filter media and to obtain a net flow through the filter approaching that of a clean liquid through a clean filter media; or in other words, a net flow of from about 70 to about 86 percent as great as a clean liquid through a clean filter media. The use of the rotary pump means and rotary valve means insures a substantially constant flow rate through the filter during each of the filtration and the backwash portions of the cycle, inasmuch as the pumps are always operating at substantially constant capacity, and the rotary valves effect a substantially instantaneous change of flow from the forward direction to the reverse direction, and vice versa. This insures a continuously fluidized, non-compacted bed of liquid and solids in front of the filter media, and the media is not permitted to become clogged with solids.

Also, in each of the embodiments described, the media diameter and open area must be related to the velocity and volume of backwash liquid such as to maintain a fluidized bed of contaminants in front of the filter media without creating unnecessary pressure drop in the apparatus and such as to obtain a high net flow rate through the apparatus.

For example, with the FIGS. 4 and 5 apparatus, a cycle time of from about 1.75 seconds to about 2.00 seconds, a backwash velocity of about 17 inches per second, a backwash volume of from about 100 to about 300 mls., or about 200 mls., and a ratio of backwash volume to unit media open area of about 800 mls. per square inch, are found to be optimum and give a net flow of from about 70 to about 87 percent of the net flow of clean liquid through a clean filter. The media diameter of these apparatus is preferably from about 1.5 inches to about 2.0 inches and the ratio of media open area to inlet open area is from about 0.5 to about 1.2. Also, for a shorter cycle time, e.g. 0.6 second as compared to 1.2 seconds, less backwash volume is required; for example, 165 to 185 mls as compared to 200 to 300 mls.

Table 3 below presents a comparison of the optimum results of several different modifications of the apparatus of FIGS. 4 and 5.

TABLE 3

OPTIMUM CONDITIONS

| Slurry | Media open area | BACKWASH | | Q net slurry |
| | | Volume | Volume | |
| % | inlet area | ml | ml/in² | Q net clean |
|---|---|---|---|---|
| 0.014 PVC/H₂O | 0.5 | 140 | 384 | 0.71 |
| 0.019 PVC/H₂O | 0.5 | 130 | 356 | 0.83 |
| 0.02  PVC/H₂O | 0.5 | 110 | 301 | 0.84 |
| 0.445 Grinding solution | 1.2 | 75 | 88 | 0.86 |

With the apparatus of FIG. 22, a backwash volume of from about 147 mls to about 367 mls per square inch, depending upon the type of media and the slurry, is required for optimum conditions. In this form of the invention, no bleed line is used, and the piping or conduits are shorter than in the other embodiments with the result that substantially less pressure drop and a substantially more efficient apparatus is achieved. The valves in the FIG. 22 embodiment are positioned side by side and are connected together for synchronous operation through suitable gearing, with the piping lengths and bends and so forth substantially minimized to insure low pressure restrictions throughout the apparatus. Further, the suction inlet of the pump is closely coupled in line with one valve and the pressure outlet from the pump is connected as closely as possible with the other vavle to reduce the length of the conduit means in the apparatus. An ejector is attached to the conduit connected with the suction inlet of the pump in order to facilitate initial priming of the apparatus.

The following table, Table 4, provides a comparison of the optimum conditions for an apparatus such as illustrated in FIG. 22.

TABLE 4

OPTIMUM CONDITIONS

| Slurry | Media Open area | Backwash | | Q net slurry |
| | | Volume | volume Media open | |
| % | Inlet area | (ml) | area (ml/in²) | Q net clean |
|---|---|---|---|---|
| 0.0215 PVC/H₂0 | 0.22 | 250 | 367 | 0.87 |
| 0.098  PVC/H₂O | 0.22 | 120 | 177 | 0.61 |
| 0.7    PVC/H₂O | 0.42 | 150 | 357 | 0.48 |
| 0.7    PVC/H₂O | 0.22 | 100 | 147 | 0.33 |

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. Rapid cyclic filtration apparatus for removing solids from liquids, including a filter media, means supporting the filter media in a slurry to be filtered, conduit means connected with the filter media, continuously operating rotary pump means in said conduit means operable to cause flow of liquid in a forward direction through the filter media and into the conduit means to filter solids from the liquid and thus obtain a liquid filtrate substantially free of said solids, a pair of rotary valve means in said conduit means in operative association with said filter media and said rotary pump means first to effect flow of liquid forwardly through the filter media to obtain a filtrate and then to effect reverse flow of a portion of the filtrate through the filter media, and control means connected with the rotary valve means to operate the valve means in synchronization to effect rapid cyclic flow of liquid through said filter media with forward flow occurring for from about 0.0001 second to about 1.0 second and reverse flow occuring for from about 0.001 second to about 1.0 second, the ratio of forward flow to reverse flow being from about 1:1 to about 15:1, to thus maintain a substantially fluidized, non-compacted bed of solids in front of the filter media and obtain a substantially uniform flow rate through the apparatus, wherein the net flow rate approaches the net flow rate of a correspondind clean liquid through a corresponding clean filter media.

2. Apparatus as in claim 1 wherein said conduit means comprises first conduit means connected with said filter media, at least one rotary pump means and one rotary valve means connected therein for selectively establishing and interrupting said forward flow of liquid, and second conduit means having rotary pump means and rotary valve means connected with said filter media for selectively establishing and interrupting said back flow of liquid.

3. Apparatus as in claim 2 wherein said first and second conduit means are separate and independent from one another and each has a valve and rotary pump therein.

4. Apparatus as in claim 2 wherein said first and second conduit means are connected with the same rotary pump means, and rotary valves are connected in each conduit means on opposite sides of said rotary pump means for selectively effecting said forward flow and said back flow of liquid through the filter media.

5. A rapid cyclic filter as in claim 1 wherein the conduit means has a predetermined crosssectional flow area and the open area of said filter media is substantially equal thereto so as to reduce the resistance of the media to flow through the system.

6. A rapid cyclic filter as in claim 1, wherein said means supporting said filter media comprises a filter media holder having an inlet end and an outlet end, said outlet end connected to conduit means.

7. A rapid cyclic filter as in claim 6 wherein said filter media comprises 37 micron stainless steel, regular weave disposed between 60 × 60 stainless steel regular weave and said media is secured over said inlet end substantially in the plane of the inlet end.

8. A rapid cyclic filter as in claim 1, wherein said conduit means includes a conduit means connected with the filter media and with the rotary pump means to effect forward flow of liquid through the filter media, and further conduit means connected with a body of filtered liquid and with the filter media for flow of filtrate reversely through the filter media.

9. Filtration apparatus as in claim 8, wherein each of said conduit means is connected to a common rotary pump means, and separate valve means is connected in each conduit means.

10. Filtration apparatus as in claim 8, wherein separate rotary pump means and valve means is connected in each conduit means.

11. Filtration apparatus as in claim 1, wherein a rotary core is in each valve means to control flow through the valve means, and shaft means connected with the core means in each valve means to rotate the core means into different operative positions.

12. Filtration apparatus as in claim 11, wherein the valve means are disposed in adjacent end-to-end relationship, and a common shaft extends between the valves to simultaneously rotate the cores, said shaft connected with power means to rotate the shaft.

13. Filtration apparatus as in claim 11, wherein the valve means are disposed in adjacent, side-by-side relationship, and a separate shaft extends through each valve, said shafts coupled together for simultaneous rotation, and power means connected with at least one of the shafts to rotate the shafts.

14. Filtration apparatus as in claim 10, wherein a rotary core is in each valve means to control flow through the valve means, and shaft means connected with the core means in each valve means to rotate the core means into different operative positions.

15. Filtration apparatus as in claim 14, wherein the valve means are disposed in adjacent end-to-end relationship, and a common shaft extends between the valves to simultaneously rotate the cores, said shaft connected with power means to rotate the shaft.

16. Filtration apparatus as in claim 8, wherein each valve means includes a cylindrical valve body, a cylindrical valve core rotatably mounted in the valve body, first and second spaced apart port means in one side of the valve body adjacent opposite ends thereof, third port means in the other side of the valve body and substantially medially of the opposite ends of the valve body, the core having a hollow interior and a plurality of openings through the side thereof including an opening adjacent each of the opposite ends of the core and adapted to be in registry with a respective one of the first and second port means in the body, and a plurality of openings intermediate the ends of the core and adapted to be in registry with said third port means in the body, the opening at one end of the valve core spaced circumferentially about 90° relative to the opening at the other end of the valve core so that flow occurs alternately and intermittently through the openings at opposite ends of the core, said openings intermediate the ends of the core always being in registry with the third port means in the body.

17. Filtration apparatus as in claim 16, wherein said opening at one end of said core is larger than the opening at the other end thereof an amount sufficient to obtain flow through the opening at said one end for approximately three-fourths of one revolution of the core and through the opening at the other end for approximately one-fourth of a revolution of the core.

18. Filtration apparatus as in claim 17, wherein the conduit means connected to the filter means for flow of liquid forwardly through the filter means includes a conduit connected at one end to the filter and at its other end to the first port means and corresponding opening in the core adjacent said one end of one of the valves, a conduit connected at one end with the third port means and corresponding openings in the core of said one valve and at its other end with the inlet to the rotary pump means, a conduit connected at one end with the outlet from the rotary pump means and at its other end with the third port means and corresponding openings in the core of the other valve, and a conduit connected at one end with the first port means and corresponding opening in the core of said other valve and at its other end with the filtrate chamber for flow of filtered liquid from the filter to the filtrate chamber.

19. Filtration apparatus as in claim 18, wherein the conduit means connected with the filter means for reverse flow of liquid therethrough, includes a conduit connected at one end with the filtrate and at its other end with the second port means and corresponding opening in the core of said one valve, a conduit connected at one end to the third port means and corresponding openings in the core of said one valve, and with the inlet to the pump means at its other end, a conduit connected at one end with the outlet from said pump means and at its other end with the third port means and corresponding openings in the core of said other valve, and a conduit connected at one end with said second port means and corresponding opening in the core of said other valve and at its other end with said filter, for conveying filtered liquid from the filtrate chamber reversely through the filter to backwash the filter.

20. Filtration apparatus as in claim 15, wherein each valve means includes a cylindrical valve body, a cylindrical valve core rotatably mounted in the valve body, first and second spaced apart port means in one side of the valve body adjacent opposite ends thereof, third port means in the other side of the valve body and substantially medially of the opposite ends of the valve body, the core having a hollow interior and a plurality of openings through the side thereof, including an opening adjacent each of the opposite ends of the core and adapted to be in registry with a respective one of the first and second port means in the body, and a plurality of openings intermediate the ends of the core and adapted to be in registry with said third port means in the body, the opening at one end of the valve core spaced circumferentially about 90° relative to the opening at the other end of the valve core so that flow occurs alternately and intermittently through the openings at opposite ends of the core, said openings intermediate the ends of the core always being in registry with the third port means in the body.

21. Filtration apparatus as in claim 20, wherein said opening at one end of said core is larger than the opening at the other end thereof an amount sufficient to obtain flow through the opening at said one end for approximately three-fourths of one revolution of the core and through the opening at the other end for approximately one-fourth of a revolution of the core.

22. Filtration apparatus as in claim 21, wherein the conduit means connected to the filter means for flow of liquid forwardly through the filter means includes a conduit connected at one end of the filter means and at its other end to an inlet of a rotary pump, a conduit connected at one end to the outlet from the rotary pump and at its other end to the third port means and corresponding openings in the core of said one valve, and a conduit connected at one end to the first port means and corresponding opening in the core of said one valve, and at its other end to the filtrate container, and the further conduit means connected with the filter means to backwash the filter means includes a conduit connected at one end with the filtrate container and at its other end with the inlet to a second rotary pump, a conduit connected at one end with the outlet from the pump and at its other end with the third port means and corresponding openings in the core of said other valve, and a conduit connected at one of its ends to the second port of said other valve and at its other end to the filter means.

23. Filtration apparatus as in claim 13, wherein one of said valve means has a pair of inlet ports in one side thereof and an outlet port in one end thereof, one of said inlet ports connected with the filter means and the other of said inlet port connected with a container of filtered liquid, said outlet port connected with the inlet of said pump, and the other of said valve means has a pair of outlet ports in one side thereof adjacent the opposite ends thereof and an inlet port in one end thereof connected with the outlet from said pump, the outlet port at said one end of said other valve means connected with the filtrate container, and the outlet port at the other end of said other valve means connected with said filter means, and the core in each said valve means having an opening therein adjacent each of the opposite ends thereof adapted to be rotated into registry with the respective ports in the respective valve means, the opening at said one end of each valve being larger than the opening at the other end thereof in an amount sufficient to obtain flow through said opening at said one end for approximately three-fourths of one revolution, and the opening at the other end of the core of a size such as to obtain flow therethrough for approximately one-fourth of one revolution, the openings at the opposite ends of the core being circumferentially displaced approximately 90° relative to one another to effect alternating flow therethrough.

24. Filtration apparatus as in claim 1, wherein the means supporting the filter media comprises an elongate tubular filter media holder having an inlet end and an outlet end, a bore through said holder extending from the inlet end of the holder to the outlet end thereof, a filter media retaining means on the inlet end of the holder, the retaining means including an annular retaining plate secured to the inlet end of the holder, a pair of annular media support plates secured to the retaining plate, said filter media secured between the media support plates, and gasket means sealed between adjacent plates.

25. Filtration apparatus as in claim 24, wherein an axially facing shoulder is on the outlet end of the holder, an annular collar on said shoulder, the media retaining means being secured to the inlet end of the holder by a plurality of elongate bolts extending through the collar and through each of said plates, and said bore flared outwardly increasing in diameter from the outlet end to the inlet end of the holder.

26. Filtration apparatus as in claim 24, wherein said retaining plate is threaded onto the inlet end of the holder to secure the media retaining means to the holder, and wherein said bore is of substantially constant diameter from one end to the other end of said holder.

27. Filtration apparatus as in claim 24, wherein the filter media comprises a 37 micron, plain weave, stainless steel disc sandwiched between a pair of perforated metal plates each having about a 75 percent open area.

28. Filtration apparatus as in claim 25, wherein the filter media comprises a Bendix diffusion bonded media consisting of a 20 micron dutch twilled weave, stainless steel, 165 × 800 mesh disc sandwiched between a pair of stainless steel 10 mesh screens, the screens each having an open area of about 56 percent, the screens and disc metallurgically bonded together, and supported between a pair of crossed support bars on each of said media support plates.

29. Filtration apparatus as in claim 1, wherein the ratio of forward flow to reverse flow is about 3:1.

30. A method of rapid cyclic filtering solid particles from a liquid and backwashing the filter and maintaining the solids in a substantially fluidized non-compacted bed comprising, disposing a filter media in a liquid having solids therein, pumping the liquid through the filter media to remove the solids, maintaining the solids in the liquid in a substantially fluidized non-compacted bed in front of the filter by maintaining the pumping of the liquid through the filter media for a first period of time of from about 0.0001 second to about 1.0 second, causing a reverse pumping of the clean liquid back through the filter media for a second period of time of from about 0.0001 second to about 1 second to clean the filter media, making the ratio of the first period of time to the second period of time substantially greater than 1:1, repeating the cycles and achieving a substantially clean filter media throughout the filtering operation by holding the solids in a substantially non-compacted bed in front of the filter media and obtaining a substantially continuous flow rate of liquid through the filter media approaching the flow rate of a clean liquid through a clean filter media.

31. The method of claim 30, wherein the ratio of the first time to the second time is made about 3:1.

* * * * *